United States Patent [19]
Pommerening et al.

[11] 3,963,874
[45] June 15, 1976

[54] BUSY-TEST ARRANGEMENT FOR ELECTRONIC PRIVATE AUTOMATIC BRANCH EXCHANGE

[75] Inventors: Uwe A. Pommerening, Webster; Glenn L. Richards, Caledonia, both of N.Y.

[73] Assignee: Stromberg-Carlson Corporation, Rochester, N.Y.

[22] Filed: Jan. 22, 1975

[21] Appl. No.: 543,042

[52] U.S. Cl. ............................ 179/18 AB; 179/18 ES
[51] Int. Cl.² ............................................ H04Q 3/54
[58] Field of Search ..................... 179/18 ES, 18 AB

[56] References Cited
UNITED STATES PATENTS

| | | | |
|---|---|---|---|
| 3,549,813 | 12/1970 | Tanke et al. | 179/18 AB |
| 3,649,767 | 3/1972 | Muroga et al. | 179/18 ES |
| 3,673,340 | 6/1972 | Casella et al. | 179/18 ES X |
| 3,819,865 | 6/1974 | Weber et al. | 179/18 ES X |
| 3,868,482 | 2/1975 | Colas | 179/18 AB X |

Primary Examiner—William C. Cooper
Attorney, Agent, or Firm—William F. Porter, Jr.; Donald R. Antonelli

[57] ABSTRACT

In an electronic private automatic branch exchange telephone system, busy test is carried out by way of a two step process. Initially, a junctor memory is scanned and the called number is compared with each ING and ED number contained in memory. At the completion of the scan and comparison a check of the calling bridge relay of the called number is made. Associated with the busy test arrangement are camp-on and call-waiting features which may also be carried out during the test.

15 Claims, 15 Drawing Figures

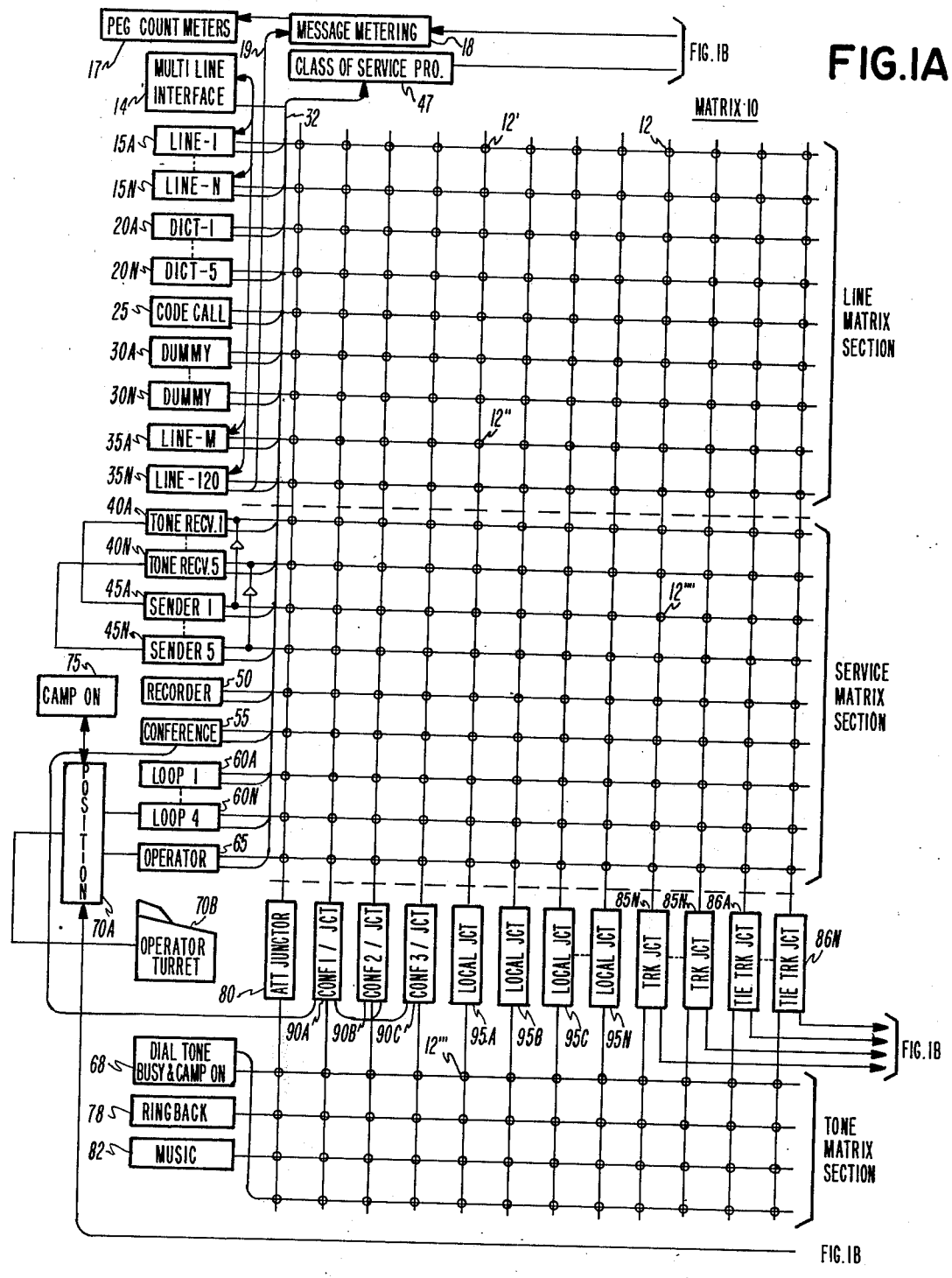

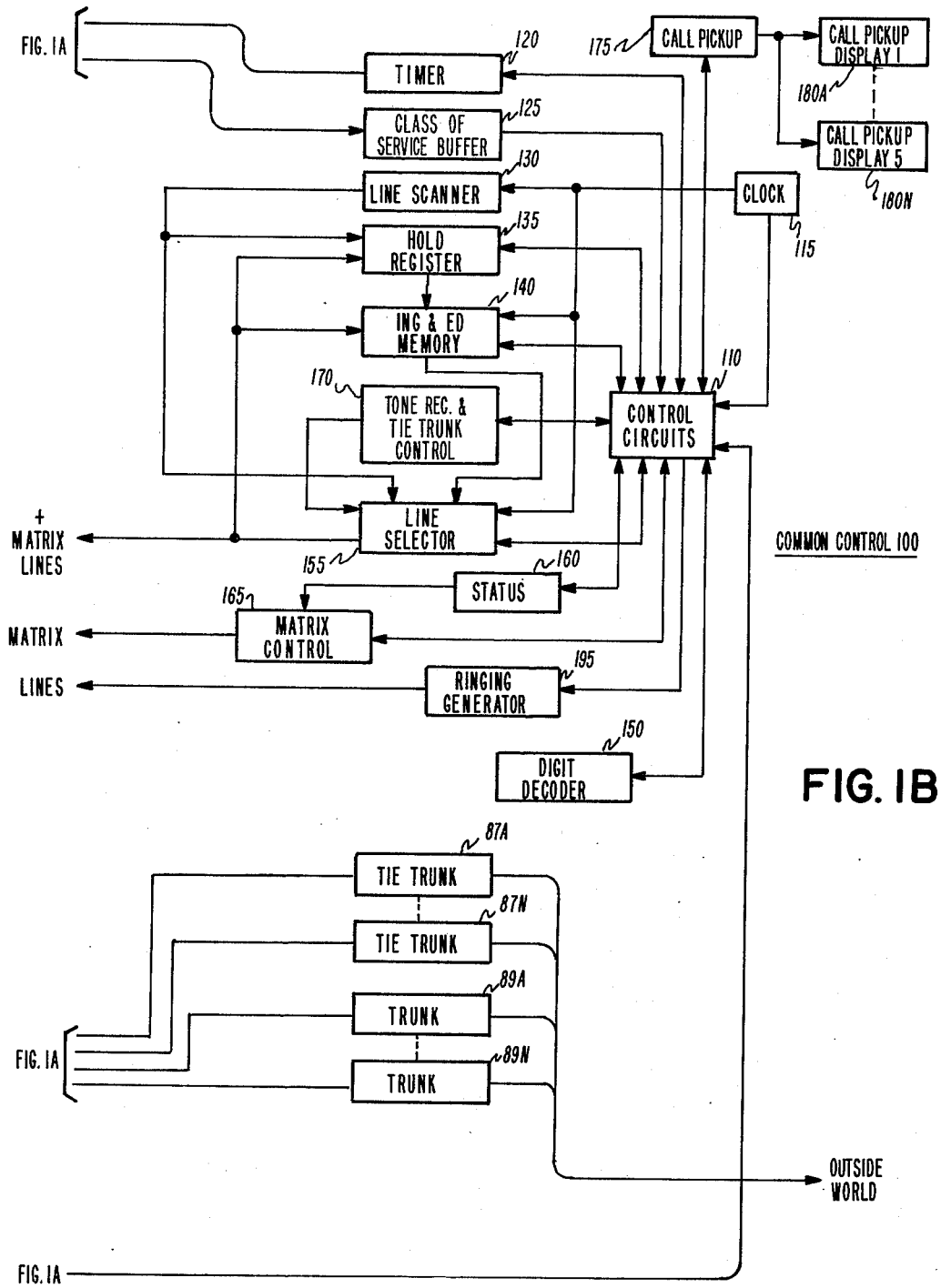
FIG. IB

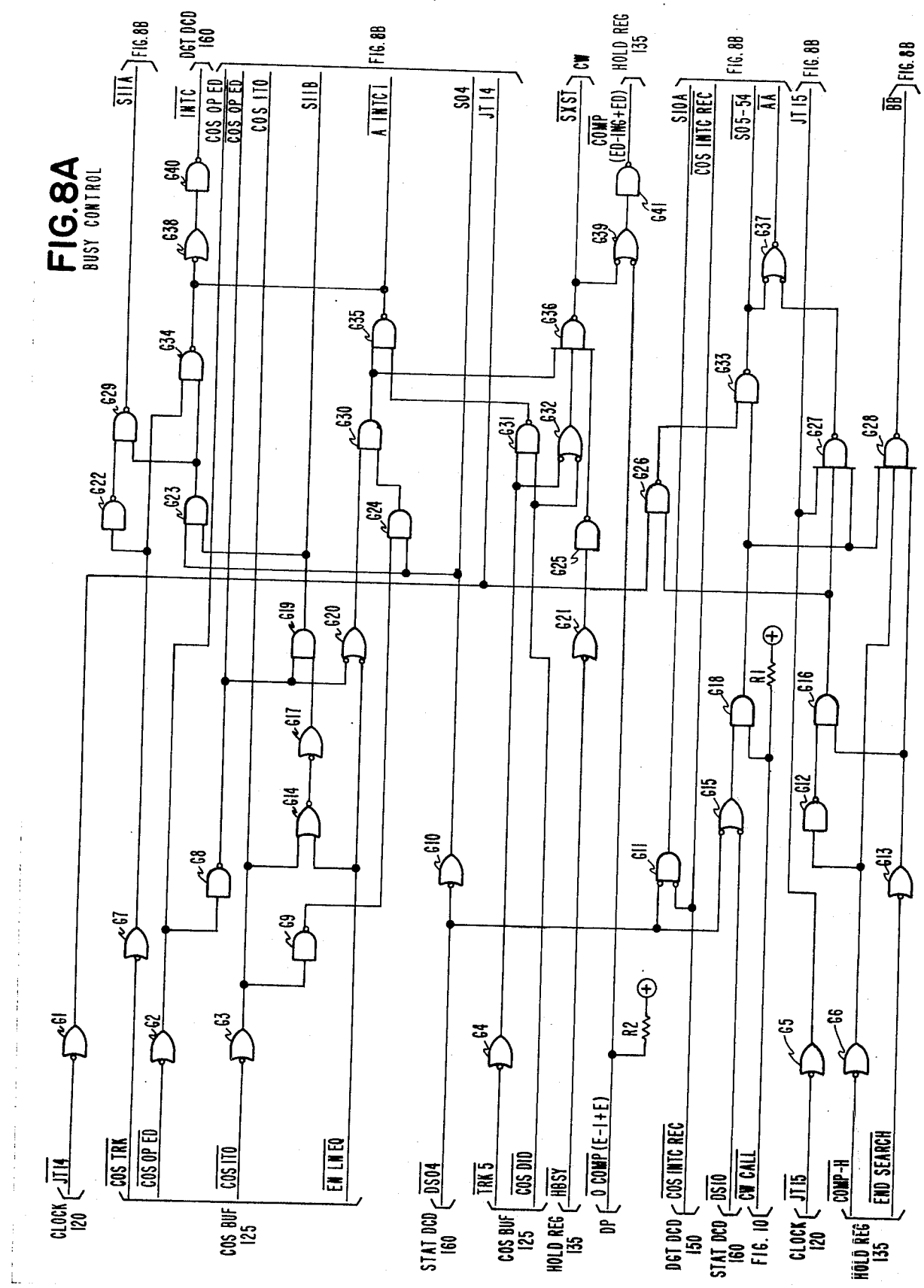

BUSY CONTROL

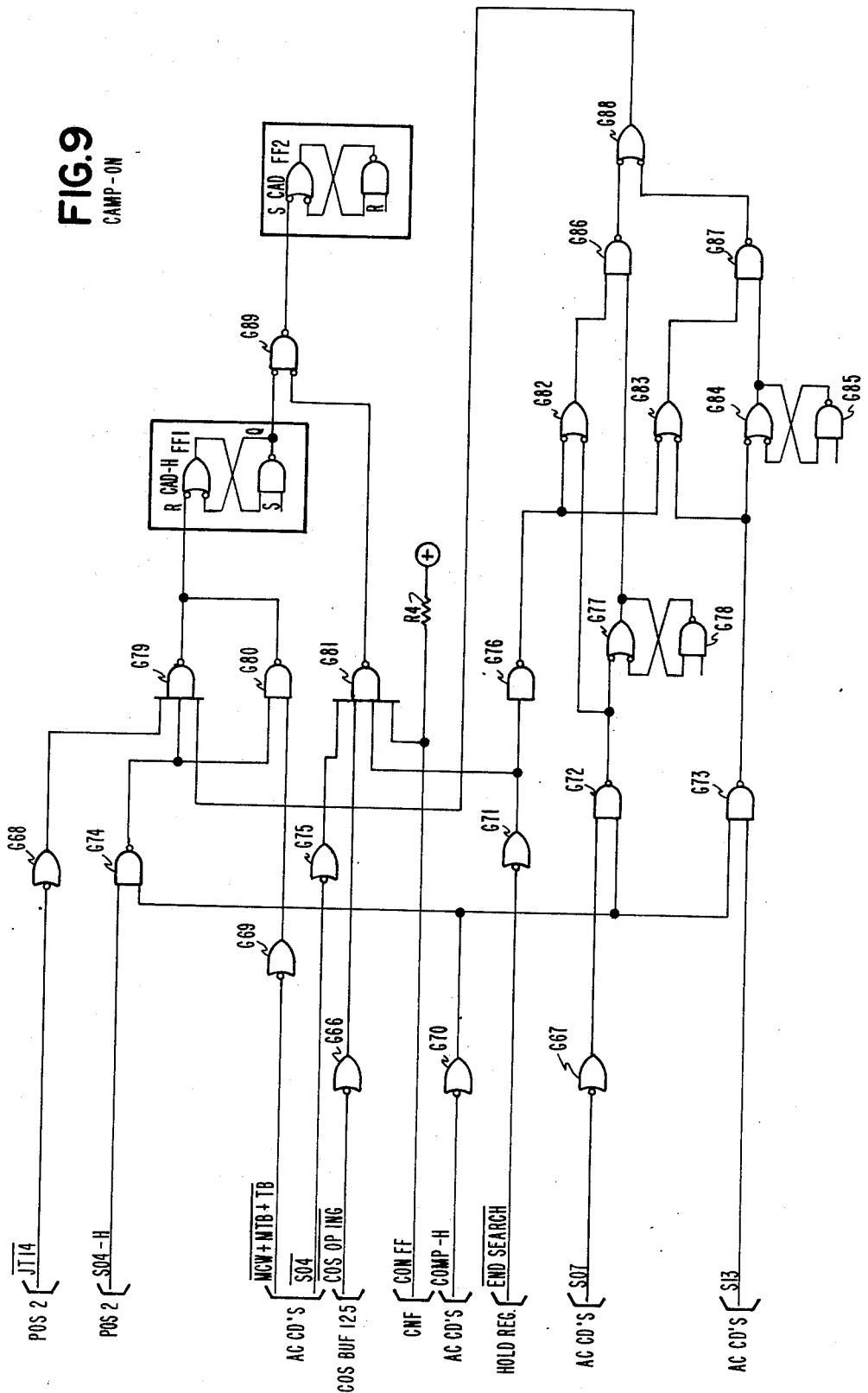

CALL-WAITING

BUSY-TEST ARRANGEMENT FOR ELECTRONIC PRIVATE AUTOMATIC BRANCH EXCHANGE

BACKGROUND OF THE INVENTION

The present invention relates in general to telephone systems, and, more particularly, to an electronic private automatic branch exchange and the arrangement incorporated therewith for effecting busy tests.

In our copending application Ser. No. 431,928, filed Jan. 9, 1974, entitled Matrix-PBX, assigned to the assignee of the present application, there is described an electronic private automatic branch exchange which is built around a space-divided rectangular solid-state switching matrix. One side of the switching matrix provides line appearances which are connected to line circuits, tone receivers, senders and operator loops. The other coordinate side of the matrix provides junctor appearances for connection with an attendant junctor, local junctors and trunk junctors. The solid-state switching matrix is a single stage matrix providing direct connections between line appearances and junctor appearances by the closing of a single cross point. The connections between lines within the system are effected simply by the interconnection of a pair of cross points associated with the respective lines and a selected junctor.

In the system there is included a clock circuit which imposes upon the system a rigid time sequence for operation of the various component elements in accordance with predetermined programs. The clock system generates distinct junctor time slots, each junctor time slot being subdivided into junctor slots for individual control functions. The system steps continuously in its scan of all junctors during a recurring time frame. In each junctor time, any calling or called line circuit associated with the junctor is addressed to obtain therefrom, on a common bus, signals which indicate the condition of the line from which the status of the line and request for service can be decoded. At the end of each complete scan of the junctors, the line scanner addresses a single one of the line circuits, to determine whether a request for service is present, the line scanner stepping to the next line circuit at the end of each complete scan of the junctors. By this means, the line scanner steps through all line appearances and thereby continuously scans the line circuits, while all of the junctors are being scanned in between each addressing of the respective line circuits.

Based upon the line and junctor scans, the system operates to allot a local junctor to any line going off-hook and a status circuit maintains a record of the state of that line circuit in a memory time associated with the particular junctor. In accordance with the state of the call, the common control circuits step the status of the particular line circuit from one program to the next until a communication connection is established from the line circuit through the switching matrix either to another line, the operator, or an outgoing trunk.

In the normal sequence of operations, when a subscriber makes a call, in order to determine whether or not it is possible for the subscriber to be connected with the desired called party, a busy test is carried out.

In conventional systems, busy test is carried out by a search for a free mark lead in order to get a path. If no free mark lead can be found, busy tone is applied to the line circuit of the subscriber. In this process, the system matrix is normally employed in conducting the search.

In the above-referred to electronic private automatic branch exchange disclosed in copending application Ser. No. 431,928, the switching matrix is employed only for providing audio between the talking parties. In the process of carrying out call connecting operations, memory circuitry within the common control stores the necessary information with respect to the lines associated with the system and the status of each call being processed. Associated with each call is a memory or storage area and since a junctor is allotted for each call, the memory will be associated with the junctor. The memory will contain all of the necessary information, e.g., the called and calling numbers, and other pertinent information, such as the status of the CB relay contact, which indicates whether a line is on-hook or off-hook.

If it becomes necessary to change junctors during the course of establishment of the communication connection, such as in the case of an outgoing trunk call, where switching between a local junctor and a trunk junctor is necessary once the destination of the call is determined, then the other junctors are either randomly addressed for information change or a temporary memory in the form of a hold register is used. A junctor associated with a communication connection through the switching matrix remains in connection with the line circuit or circuits involved throughout the call and, at the end of the call, the junctor memory is cleared and the particular junctor is released.

BRIEF DESCRIPTION OF THE INVENTION

In accordance with the present invention, busy test is effected initially by scanning the junctor memory to determine whether or not a junctor associated with the call number is stored in memory, thereby indicating that it has already been allotted for another call and, secondly, at the end of the scan of the entire junctor memory, the CB relay contact of the called number is tested to determine, whether or not the called party has come off hook and is, therefore, busy.

Because of the differences in both the type of call desired to be established by the calling party and the differences among the types of called parties themselves, the result of the busy test will not always be the same. For example, in the normal situation, where a calling subscriber dials a called subscriber, if the called subscriber is busy, the result of the busy test will be the supply of busy tone to the calling subscriber. However, the called subscriber may be equipped with a message recorder, in which instance, simple busy tone would not be delivered to the calling party, but, instead, information relative to the recording of a message would be transmitted. As another feature, the called number may be equipped with a call-waiting feature, so that even if the called party is already engaged in a call, if another party dials the called party equipped with a call-waiting feature, the called party will be advised by way of a distinct tone indicating that another calling party desires a connection and, at the same time, the calling party will be put on hold to permit opportunity for the called party to place the other party on hold and flash the hook switch to obtain connection to the newly calling party.

In a similar situation, the busy test of the present invention is equipped with a camp-on feature, which permits the attendant to put the incoming calling party on hold and advise the busy party that an incoming call is waiting to be connected to the called number. For both the call-waiting and camp-on features, the normal busy tone is not delivered to the calling party, which would cause the calling party to return to an on-hook condition, but rather the calling party is advised that although the called party is busy, the system had advised the called party of the caller's incoming call, so that the calling party may wait and be connected with the called party.

The features, objects and advantages of the present invention will become clear from the following detailed description of a preferred embodiment presented in connection with the accompanying drawings.

BRIEF DESCRIPTION OF THE DRAWINGS

FIGS. 1a and 1b, in combination, form a schematic block diagram of the electronic automatic branch exchange incorporating the present invention;

FIGS. 8a, 8b, 9, and 10 are detailed schematic circuit diagrams employed for carrying out the logical functions depicted in FIG. 7.

THE BASIC SYSTEM

Figure 2C:
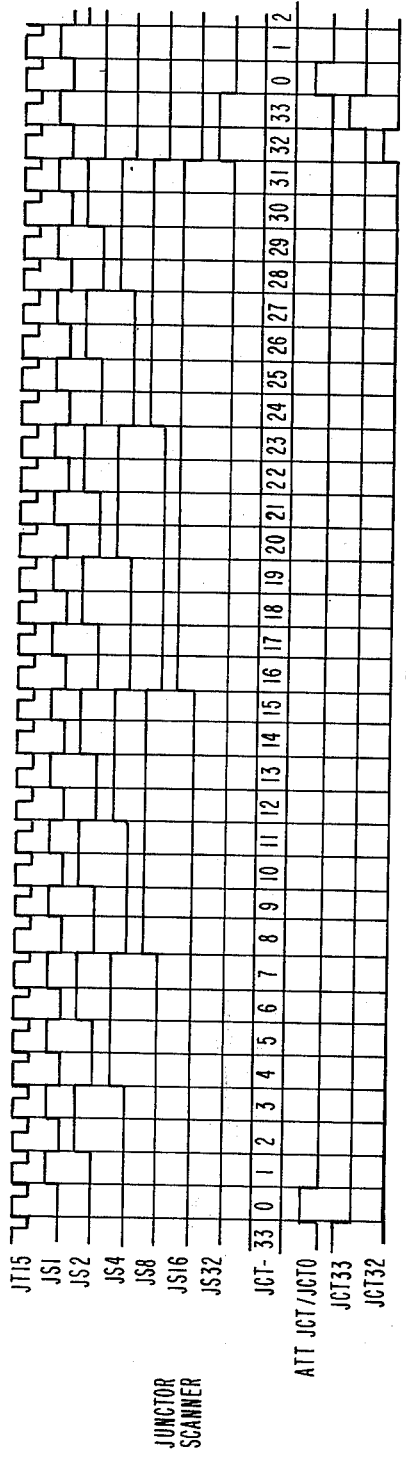
FIGS. 2a, 2b, and 2c are waveform diagrams of clock signals used to control the timing of functions within the system.

An electronic private automatic branch exchange in which the present invention may be incorporated includes a switching matrix 10 formed by integrated circuit techniques of a plurality of solid state crosspoint switches of the type disclosed in the aforementioned copending application Ser. No. 431,928. The matrix 10 is a single rectangular array of crosspoints divided into three sections, i.e., a line matrix section, a service matrix section and a tone matrix section, as seen in FIG. 1. The matrix serves to establish a low impedance electrical path for passing audio signals between a selected one of a plurality of input leads and a selected one of a plurality of output leads.

Line appearances are provided on the left side of the line matrix section, as seen in FIG. 1a, including a plurality of line circuits 15a through 15n and 35a through 35n. Between the line circuits there are provided connections to special lines which take the place of regular lines in the system. These special lines are dictation access circuits 20a through 20n, a code call circuit 25 and a plurality of dummy line tie trunks 30a through 30n.

Line appearances at the service matrix section take the form of a plurality of tone receivers 40a through 40n, a plurality of register senders 45a through 45n, an intercept recorder 50, a conference bridge 55, a plurality of operator loop circuits 60a through 60n and an operator line circuit 65. The number of tone receivers, register senders and operator loop circuits, like the number of line circuits connected to the line appearance inputs of the matrix 10 depend upon the traffic requirements and size of the system.

The outputs of the matrix 10 are provided in the form of a plurality of junctor appearances, as seen in FIG. 1. The junctor appearances are associated with an attendant's junctor 80, a plurality of conference junctors 90a through 90c, a plurality of local junctors 95a through 95n, a plurality of trunk junctors 85a through 85n, and a plurality of tie trunk junctors 86a through 86n. The trunk junctors 85a through 85n are connected to corresponding trunks 89a through 89n, and the tie trunk junctors 86a through 86n are associated with corresponding tie trunks 87a through 87n.

The tone matrix section of the matrix 10 provides inputs on respective lines from a combined dial tone generator and busy-camp-on tone generator 68, along with inputs from a ring-back tone generator 78 and music source 82. The outputs of the tone matrix section are connected through the respective junctors to the junctor appearances of the line and service matrix sections of the matrix 10.

The operator complex includes, in addition to the loop circuits 60a through 60n and the operator line circuit 65, an operator position circuit 70a to which is connected an operator turret 70b. A camp-on circuit 75 providing a special feature in the system is also connected to the operator position circuit 70a. As another special feature of the system, a message metering circuit 18 and one or more peg count meters 17 are associated with the line circuits via a bus 19.

The matrix 10 functions to selectively connect an input from a line to a selected junctor by closing the appropriate cross-point in the line matrix section and to provide an appropriate cross-point in the tone matrix section. Connection from one line to another line is also effected by closing the pair of crosspoints in the line matrix section associated with the respective lines and a common junctor.

FIG. 1b schematically illustrates the various elements of the common control 100, the heart of which is formed by a plurality of control circuits 110 in the form of a hard-wired programmer. The timing of the various functions which are performed in the system under control of the control circuits 110 is regulated by the various timing signals produced by a clock 115, which is directly connected to the line scanner 130, which serves to generate the line scanning signals, and is connected through the control circuits 110 to the various other elements in the common control 100 to provide a time base for the various functions thereof.

A timer 120 is also provided in the common control 100 to analyze the information concerning the line conditions and other information from the junctor and perform memory timing functions within the system. For example, on-hook and off-hook timing, time-outs, flash detection and other conventional timing functions are performed by the timer 120. In this regard, the timer 120 operates with the control circuits 110 to perform whatever timing functions are necessary within the system.

A class of service buffer 125 forms an interface between the class of service programmer 47 and the logic circuitry of the common control 100. Thus, the various line condition which are derived through the class of service programmer 47 each time a line is addressed will be passed to the control circuits 110 through the class of service buffer 125.

The line scanner 130 is driven from the clock 115 and serves to scan each of the lines in turn continuously to detect requests for service. In this regard, the lines are addressed by the line scanner in conjunction with the scanning of the junctors, a line being addressed from the line scanner at the end of each complete scan of all of the junctors, as will be described in greater detail in connection with line selection and matrix control operation. Each time a line is addressed by the line scanner 130, the calling bridge relay information within the line is forwarded via the common bus 32 and the class of service programmer 47 to the control circuits 110 in the common control 100 via the class of service buffer 125. In this way, the status of the line, i.e., whether or not it is requesting service of the system, is monitored during the continuous scanning of the lines by the line scanner 130.

A hold register 135 is provided as a temporary memory which is used for various systems operations in conjunction with information stored in conjunction with the various junctor circuits. As will be described in greater detail, the system stores the identity of the lines associated with any junctor during the entire duration of a call in the system, so that, during the establishment of the communication connection between parties and in providing various functions requested by the parties during the call, it is necessary at various times to temporarily store information as functions are being performed within the system by the common control 100. The hold register 135 provides the temporary storage capability in the system.

The system includes an ING and ED memory 140 which forms the basic junctor memory portion for storing the calling and called numbers identifying the lines associated with each of the junctors. The memory 140 includes storage positions assigned to each of the junctors, which storage positions are continuously scanned by clock signals derived from the clock 115. Thus, if a junctor is associated with one or more lines, the scanning of the portion of memory 140 assigned to that junctor will produce the calling and/or called numbers of those lines which are stored therein. In this way, the identity of the cross points in the matrix 10 associated with the line or lines involved with the junctor can be identified.

A line selector 155 receives line designations from the line scanner 130 and from the junctor memory 140, and in response to the clock signals from the clock 115 selectively addresses cross points in the matrix 10 and selected lines at the proper times. As already indicated in connection with the description of the solid state cross point matrix 10, addressing alone of the cross point will open the cross point, while addressing in combination with a positive request for actuation of the cross point will close the cross point. Whether or not the cross point is to be opened or closed is determined by the status of the call based upon the progress of the connection as determined by the control circuits 110 from the information derived from the lines via the class of service programmer 47 and class of service buffer 125. The system control progresses in states, with the individual states being monitored by the status circuit 160, which stores the state which any particular call is in and advances under control of the control circuits 110 as the call progresses from one state to the next in a particular program. Thus, the information concerning the desired condition of the cross point, i.e., whether it is to be open or closed, is derived from the status circuit 160. If the cross point which is addressed from the line selector 155 is to be closed for a particular call, matrix control 165 will receive information from the status circuit 160 to this effect and generate a positive request signal for closing of the cross points. If the cross points are not to be closed, the matrix control 165 will produce no output as the cross points are addressed, thereby effecting an automatic opening of the cross points.

A ringing generator 195 of any known form is provided for application of ringing current to the lines under control of the control circuits 110. While the ringing generator is in itself a conventional circuit, the application of ringing to the line in the system of the present invention is somewhat different than known systems in view of the multiplex addressing of the various lines by the common control. Thus, the output of the ringing generator 195 may be connected simultaneously to all lines since the lines are addressed in turn during the scanning of the junctors associated therewith. In this way, the system requires only a single ringing generator, thereby materially simplifying the system and reducing the costs thereof.

The digit decoder 150 performs analysis of the incoming digits and makes decisions concerning these received digits. For example, the digits received by the digit decoder 150 are analyzed for line-to-line calls, line-to-trunk calls, toll restrictions and other information. The information provided by the digit decoder 150 then serves to initiate various control functions within the control circuits 110 as the various states of the call progress.

As a special feature, the system also provides a transfer circuit 170 which effects transfer between lines and between trunks and lines, as may be required.

The function of the various elements of the system in which the present invention will be incorporated will become clearer from a general description of the various basic functions of the overall system.

BASIC SYSTEM OPERATION

In the following description, reference will be made to the various components of the overall system shown in FIGS. 1a and 1b and the operational sequence of events shown in FIG. 6, which is a status diagram of a basic line circuit-to-line circuit call.

The lines are continuously scanned from the line scanner 130 by way of the line selector 155 within the common control 100 so that a line circuit requesting service will ultimately be addressed, thereby permitting the state of the calling bridge relay in the line circuit to be passed on through the class of service programmer 47 along with class of service information concerning that particular line circuit to the common control 100. Assuming that the line circuit 15a has gone off-hook, and is now in status 1, requesting service, this line will ultimately be addressed by the line selector when the line scanner 130 reaches this line in its scan of all the lines. (Initially, before the call is made, the calling party is on-hook and, the call is at status 0.) Now, assuming that the line circuit 15a goes off-hook, and is requesting service, the line will ultimately be addressed by the line selector when the line scanner 130 reaches this line in its scan of all the lines. At the same time, the line selector 155 will also address all of the cross points of the matrix 110 associated with that line circuit. In this case, all of the cross points associated with the line circuit 15a along the first horizontal of the matrix including the cross point 12' will be addressed. If, as a result of some misoperation, one or more of these cross points have been inadvertently closed, the addressing of the cross points at this time will automatically open the cross points in the absence of positive control from the matrix control 165, indicating that one or more of these cross points should be closed. Since line 15a has just requested service, none of the cross points should be closed and, therefore, the status circuit 160 will provide no indication to the matrix control 165 that any of the cross points involved should be closed. In view of the fast scanning times provided within the system for scanning the lines and junctors, it can be seen that a misoperation of a cross point will be immediately corrected, so that no effect upon any communication connection through the matrix will result, nor will such cross point misoperation be noticeable to either party except for a click as the cross point is opened or closed to correct the state thereof. Further details concerning the unique operation of the matrix under control of the line scanner 130, line selector 155 and matrix control 165 are disclosed in our copending application Ser. No. 431,878, filed Jan. 9, 1974, now U.S. Pat. No. 3,903,374 which application is assigned to the assignee of the present application.

When the control circuits 110 receive an indication through the class of service buffer 125 that the line circuit 15a has requested service, the circuits 110, which include a junctor allotter, will assign a free junctor to the line circuit and request that the calling line number of the line circuit 15a be stored within the junctor memory 140 in the time position assigned to the selected junctor. Details of the junctor memory 140 are disclosed in applicants' copending application Ser. No. 478,960, filed June 13, 1974, and assigned to the same assignee as the present invention. The control circuits 110 will also address the status circuit 160 to record in the memory thereof that the call associated with the selected junctor is in the first state of operation.

Assuming that the junctor allotter in the control circuits 110 selects the local junctor 95a, the calling line number of the line circuit 15a will be stored in the memory position of the junctor memory 140 permanently assigned to the local junctor 95a and, each time the local junctors are scanned, the line number of the calling line 15a will be forwarded to the line selector, so that the line 15a can be addressed at this time and the cross point associated both with the line 15a and the junctor 95a, i.e., cross point 12' shown in FIG. 1a, can be addressed. The status circuit 160 indicates to the matrix control 165 that the call is in a state wherein the cross point 12' should be closed and, therefore, the matrix control 165 will forward a positive request for closing the cross point 12' at the time the cross point is addressed. As a result, the line circuit 15a will be connected through the matrix 10 to the local junctor 95a.

At the same time that the cross point 12' is addressed and closed to enabled connection between the line circuit 15a and the local junctor 95a, the matrix control 165, under control of the status circuit 160, addresses the cross points of the tone matrix section of the matrix 10, associated with the dial tone generators 68, so that the cross point 12" will be closed, thereby connecting dial tone generator 68 through the local junctor 95a to the line circuit 15a. Upon commencement of dial pulsing, the status of the call shifts from status 1 to status 3, as shown in FIG. 6. At status 3, dialing is carried out between status 2 and status 3, the control circuits 110 within the common control 1000 advancing the status circuit 160 of the junctor 95 to status 2 if the calling line circuit has rotary dial equipment or to status 3 if the calling line circuit has tone dial equipment, as determined by the class of service information for that line circuit received from the class of service programmer 47. The determination of the dialing is effected by the timing of the on and off condition of the CB relay, for the purpose of recognizing whether dial pulses are being generated.

Each time the junctor 95a is scanned, the number of the calling line circuit 15a will be provided by the junctor memory 140 to the line selector 155, which will address the line, thereby permitting the calling bridge relay state to be monitored by way of the bus 32 and the class of service programmer 47 within the common control 100. The digit decoder 150 will accumulate the calling bridge relay states and provide to the control circuits 110 digit information which will be stored in the memory portion of the junctor memory 140 assigned to the junctor. Eventually, the junctor memory 140 will have stored in the position thereof assigned to the junctor 95a both the calling and called line numbers.

Once it has been determined by the timer 120 that the calling line 15a has completed dialing, the control circuits 110 will advance the status circuit 160 to status 4 in the position of the memory thereof assigned to the junctor 95a. Thus, the status of the call shifts from status 4 at the end of dialing.

Status 4 relates to the busy test operation of the system and the details thereof, which make up the present invention, will be described hereinafter. For the movement, let it be assumed that the called line circuit has been determined to be busy, so that the tone matrix section of the matrix 10 is once again addressed from the matrix address 165, thereby connecting busy tone from the generator 68 through the local junctor 95a to the calling line circuit 15a. Busy tone is shown at status 11.

If, on the other hand, the called line circuit is free, the control circuits 110 will advance the status recorded in the status circuit 160 to status 5, for application of ringing from the ringing generator 195 to the called line circuit and to address the tone matrix section of the matrix 10, to thereby connect ring back tone generator 78 through the local junctor 95to the calling line circuit 15a. Control over the tone matrix section of the matrix 10 to provide for connection of dial tone, busy tone, ring back tone and music to the lines through the selected junctors is described in greater detail in our copending application Ser. No. 431,885, filed Jan. 9, 1974, now U.S. Pat. No. 3,904,831 assigned to the assignee of the present application.

Matrix control 165, upon receiving the calling and called line numbers from the junctor memory 140 as the junctor 95a is scanned, will address the cross point 12' and also the cross point associated with the called line, for example, cross point 12" associated with line 35a. Thus, when the called party answers in response to the applied ringing, he will be connected by way of cross points 12' and 12" in the matrix 10 to the calling party and the respective line circuits 35a and 15a will receive ground, to maintain cross point bias, from the local junctor 95a for the duration of the call. At this time, the status of the call is now at status 7, having shifted from status 6, so that the status circuit 160 is advanced by the control circuits 110 to status 7, indicating that the local call is in progress.

When the lines are equipped with tone dial equipment, this class of service for the line circuit is indicated to the common control by the class of service programmer 47. In this regard, the class of service programmer 47 typically includes a panel having selected class of service plugs, so that the features of the system may be allocated on a per line basis and the information with respect thereto may be provided to the common control. Thus, in addition to providing a path for the calling bridge relay information from the lines, the class of service programmer 47 also submits at this time class of service data concerning the particular line for use by the common control 100.

When a call is in state 3 indicating dialing from tone dial equipment, the common control 100 effects connection via the matrix between the calling line and an available one of the tone receivers 40a through 40n. The tone receiver converts the tone dial into the corresponding binary number, which is received by the common control 100 and placed into the ING and ED memory 140.

Since the operator loop circuits 60a through 60n are merely provided as line appearances at the input of the matrix 10, the functions associated with the generator position are greatly simplified. Because of the fast switching capability of the cross points in the matrix 10, the split functions normally associated with incoming connections to the operator may be performed with the matrix cross points. Thus, special trunk circuits having separate operator access with split tip and ring pairs, as normally required in conventional systems, are not required in the system of the present invention. In addition, since the split functions are performed in the present system within the matrix 10 by selective operation of the cross points, the operator loop circuits and position circuits which normally control such functions can be greatly simplified. Since the operator loop circuits are effectively line circuits in the present system, switching a trunk to a line or to an operator is the same function for the system. This makes it also possible to greatly simplify the loop circuits.

Since the junctor controls the cross points for the required split functions in connections to the operator complex, hardware for special trunks, like information trunks, is not required in the system. The junctor performs the information trunk duties without requiring extra equipment, thereby simplifying the system. Also, special access trunks for the operator, which are usually quite complex, are not required. The junctor circuit once again takes care of the duties normally provided in this regard. In addition, due to the elimination of information trunk hardware, tandem operation for operator extended calls to trunks between information trunks and the central office trunks is not required. The operator is accessed by the line via the local junctor which acts as the information trunk, and when the operator extends the call to a central office trunk, the local junctor is dropped and the central office trunk junctor takes over the duties.

In outgoing trunk calls, it is necessary for the system to switch from a local junctor to a trunk junctor. In this regard, the line circuit is initially connected to a local junctor upon detection of the request for service in the manner described above by closing the cross point in the matrix 10 common to the line circuit and a selected available local junctor. In the foregoing example, by closing cross point 12', the line circuit 15a can be connected to the local junctor 95a. Addressing of the tone matrix section provides connection of the dial tone generator 68 through cross point 12''' and the local junctor 95a to the line circuit 15a. When dialing commences, the cross point 12''' is released, disconnecting dial tone from the line circuit and the dialing impulses are received in the common control 100 via the class of service programmer 47. The digit decoder 150 for outgoing trunk calls will recognize the first digit as a request for access to a trunk circuit and the control circuits 110 will indicate the need to connect to a trunk junctor. The junctor allotter in the control circuits 110 will select an available trunk junctor, for example, junctor 85a connected to the trunk 89n.

Figure 6:
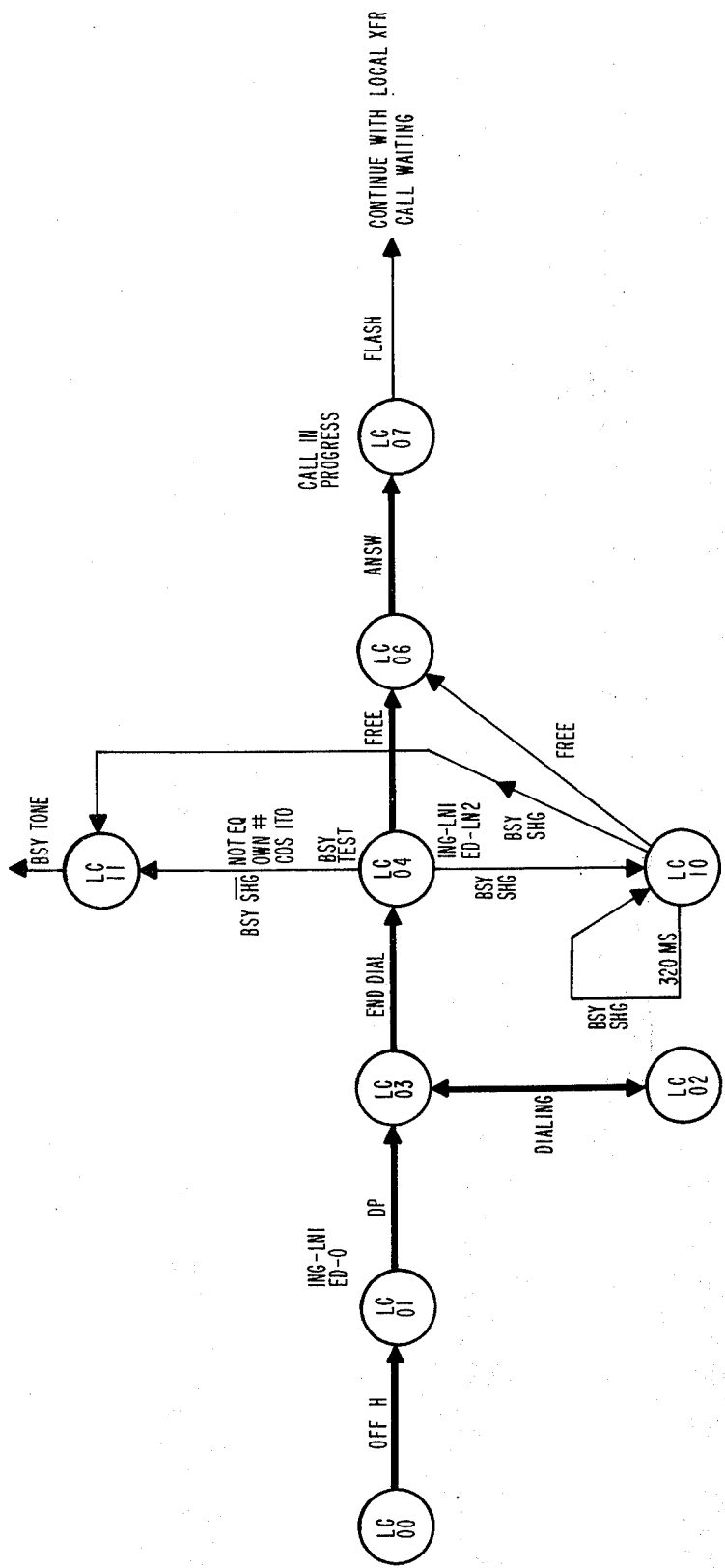
FIG. 6 is a status diagram showing the sequence of events typically carried out for a local call in accordance with the present invention.

In the diagram shown in FIG. 6, return lines from the various status conditions to the original on-hook condition have not been shown for purposes of simplicity. Of course, if, during the establishment of a call, the calling party goes back on-hook, the set-up of the call will be terminated. The details of the particular operations carried out for busy-test in accordance with the present invention will be described in more detail below in connection with FIGS. 7 through 10.

Before proceeding with the description of the details of FIGS. 7 – 10, the timing of the system, the operation of the status circuit, and the junctor memory will be described.

SYSTEM TIMING

Figure 2A:
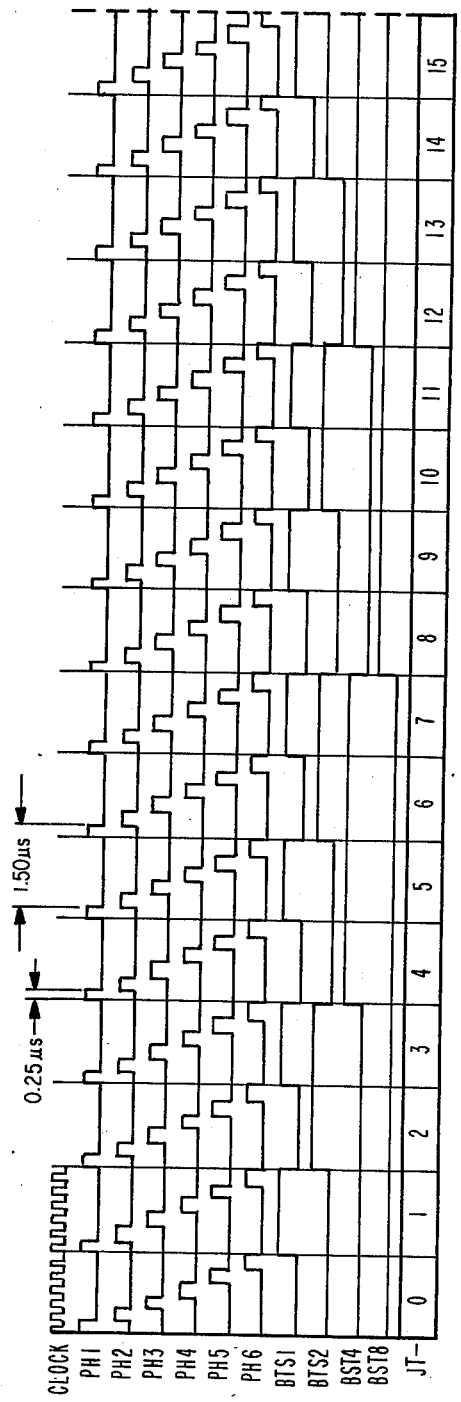
Figure 2B:
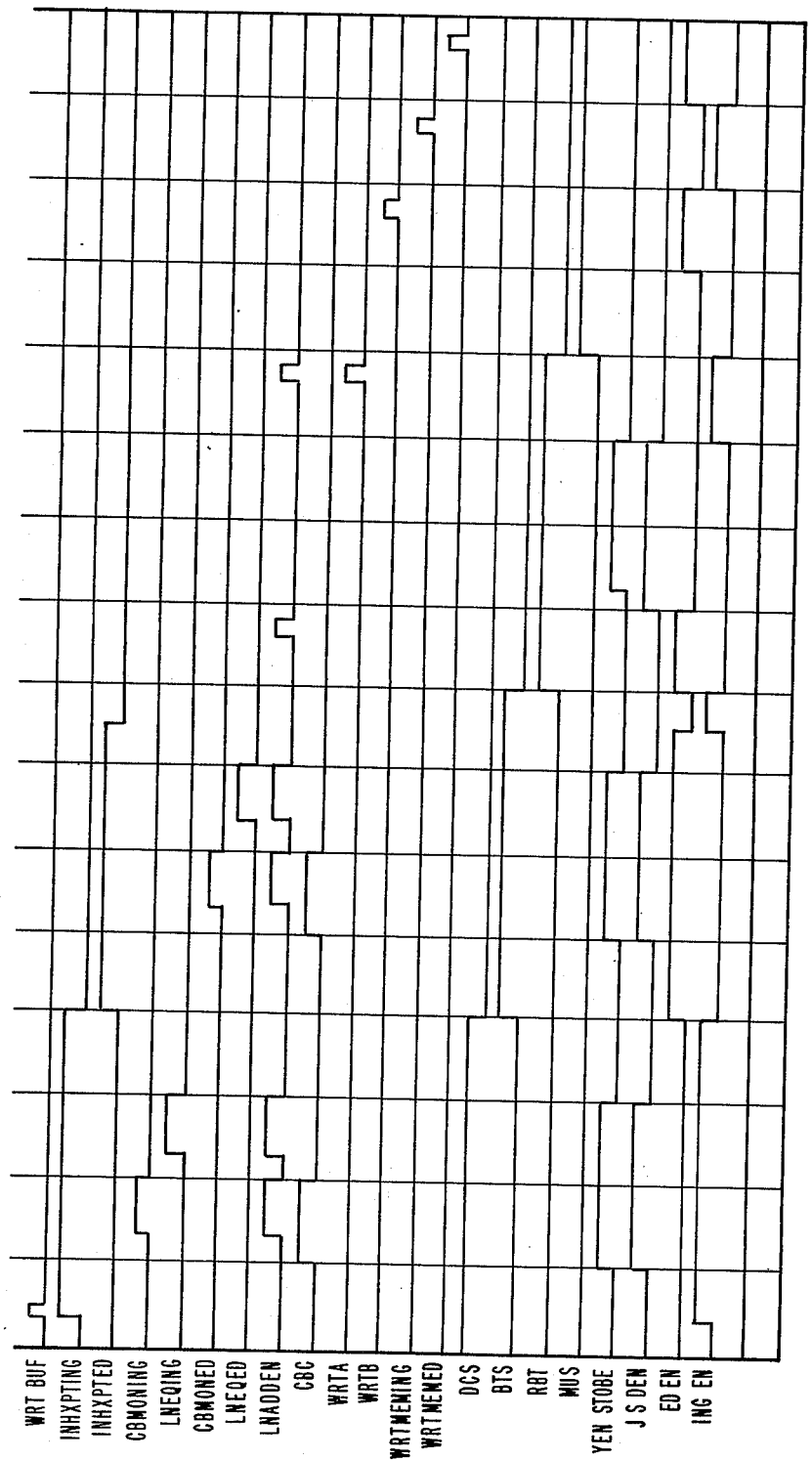

The system timing is controlled by the clock 115 in the common control 100 on the basis of various clock signals such as presented in FIGS. 2a through 2c. Typically, the clock includes a 4 MHz crystal oscillator connected to a divider chain and various decoders to produce the required clock signals for controlling the various elements of the system.

As already indicated in the general system description, the junctor memory 140 includes a storage position for each of the junctors in the system and this memory is recirculated so that the information stored in each junctor position is scanned successively during a recurring time frame. In the preferred embodiment disclosed in this application, 32 junctors are connected to the output of the matrix 10, so that the junctor memory 140 will include 32 junctor positions. In addition, the junctor memory 140 also includes positions 32 and 33 which represent time periods during which a scanning of the lines is effected. Thus, after all junctors have been scanned, the line number designated by the line scanner 130 will be addressed during the 32 and 33 junctor positions to determine whether there is a request for service in connection with that line. Thus, at the end of each 32 time position, the line scanner 130 will be advanced to the next line, with the result that the lines are scanned one at a time at the end of each complete scan of the junctors.

Each junctor time position is subdivided into junctor time slots during which the various functions required in connection with the call associated with the junctor are performed under control of the control circuit 100. During one or more of the time slots of each junctor time, one or more functions may be performed by various elements of the common control as required by the state of the call under control of the control circuits.

The clock 115 is typically formed by a crystal oscillator connected to a divider chain and various decoders to produce the clock signals required for controlling the functions to be performed within the system. FIG. 2a illustrates the output of a 4 MHz crystal oscillator from which phase signals PH1 through PH6 are derived by a clock phase generator producing a division by six of the basic frequency. The output of the clock phase generator is connected to a bit time slot counter effecting a division by sixteen to produce the binary bit time slot signals BTS1 through BTS8. A decoding of the four bit binary time slot signals produces the sixteen junctor time slot signals JT0 through JT15.

Further decoding of the binary bit time slot signals BTS1 to BTS8 also produces various timing signals which are utilized throughout the system. These timing signals which will be utilized in the various common control circuits to be described are illustrated in FIG. 2b in relation to the sixteen junctor time slot signals JT0 through JT15. The function of these timing signals will be described in connection with the description of the detailed operation of the various common control elements.

FIG. 2c illustrates the waveforms which are derived from the junctor scanner portion of the clock. A further division by 34 produces the junctor scan signals JS1 through JS32. A decoding of these junctor scan signals then produces the junctor signals JCT0 through JCT33. Additional decoding produces the signal ATT JCT which represents the junctor 0 position, as well as the junctor 32 and the junctor 33 signals JCT32 and JCT33.

THE STATUS CIRCUIT

The status circuit 160 basically forms a memory including a storage position for each of the junctors to store the state of the call associated with each of the junctors. As already indicated in the general system description, the common control steps progressively through various states during which various operations are performed under control of the control circuits 110 to perform the functions required by the system. To determine what functions need to be performed during each junctor scan, the control circuits 110 determine from the status circuit the state of the call associated with that junctor. As the functions associated with each state are completed, the control circuits 110 advance the status circuit to the next state for the particular junctor involved so that a continuous record of the state of the call associated with each junctor is maintained within the status circuit.

Figure 5:
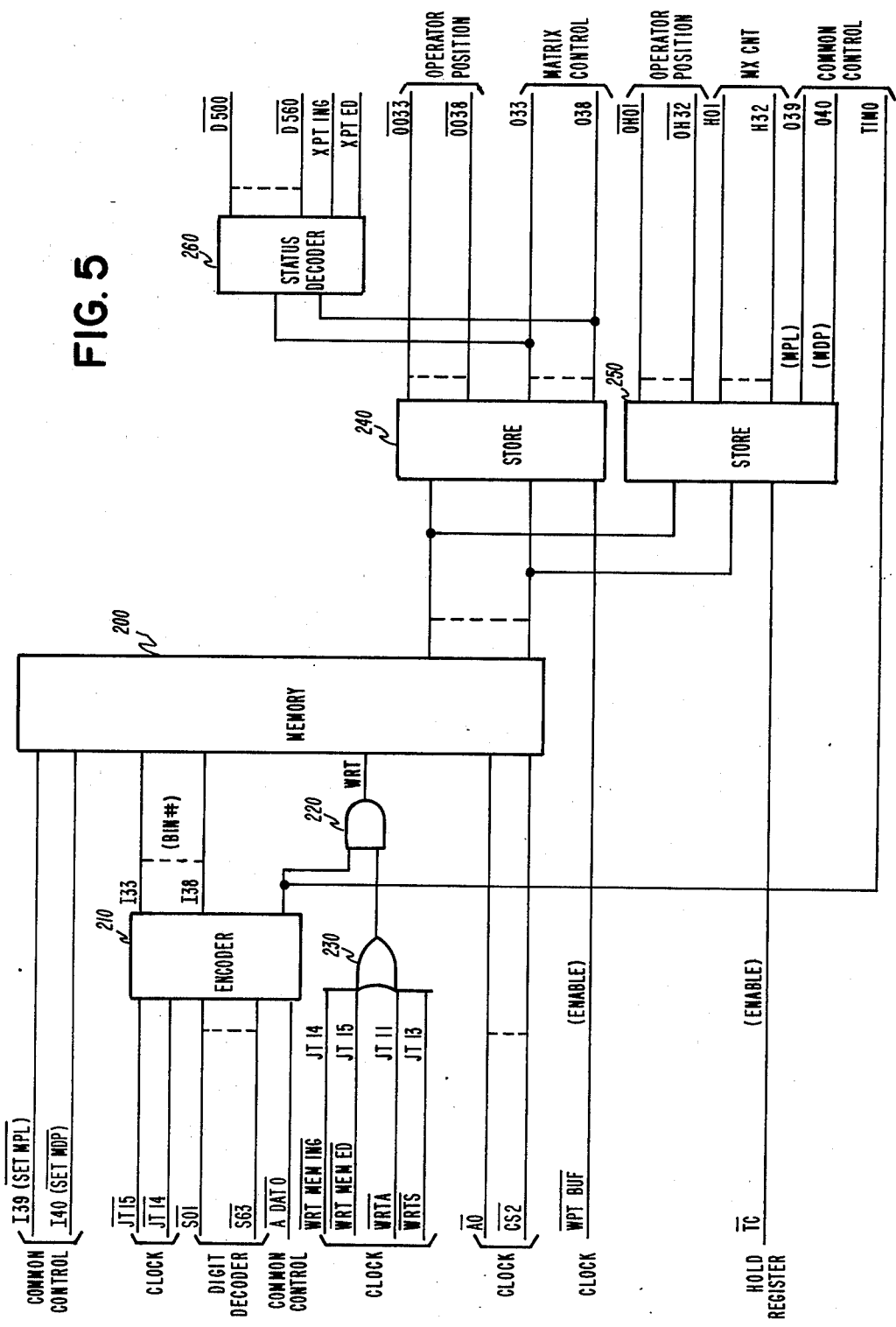
FIG. 5 is a schematic block diagram of the status circuit incorporated with the present invention.

In the status circuit, shown in FIG. 5, the memory 200 includes thirty-four junctor positions for the junctors JCT0 through JCT31 as well as the junctor times JCT32 and JCT33. The status of the call associated with each junctor is stored in the junctor times of the memory 200 in binary form, and therefore, an encoder 210 is provided to receive from the control circuits 110 the status signals SO1 through S63 and provide the binary equivalents thereof on output lines 133 through 138 to the memory 200. Certain of the status signals SO1 through S63 are time shared at the input to the encoder 210 under control of the clock signals JT15 and JT14 from the clock 115. A further input to the encoder 210 from the control circuits 110 is the signal A DAT 0 indicating that all data is to be zeroed, i.e., the status stored in connection with a given junctor is to be 0, for example, when a call has been terminated. The status indications are applied from the encoder 210 to the memory 200 during various time slots by controlling the gate 220 from the output of gate 230.

The clock signals WRT MEM ING, WRT MEM ED, WRTA and WRTB generated during the junctor time slots JT14, JT15, JT11 and JT13, respectively, are applied through the gate 230 to enable gate 220 to apply the write signal WRT to the memory 200 permitting the status data from the encoder 210 to be written into the junctor period of the memory. The junctor periods are continuously scanned by the clock signals A0 through CS2 derived from the memory address generator controlled from the clock by the junctor signals JS1 through JS32.

In addition to the binary outputs 133 through 138 from the encoder, the memory 200 also receives direct codes of status 139 and 140 from the control circuits 110. The binary status code is read out of the memory 200 into a pair of buffer stores 240 and 250 under control of the enable signals WRT BUF and TC from the clock and hold register, respectively. The buffer store 240 provides the binary outputs 0033 through 0038 to the operator complex, and the signals 033 through 038 to the control circuits 110 and the matrix control 165. The signals 033 through 038 are also applied to a status decoder 260 which provides a binary-to-decimal conversion of the signals into status signals DS00 through DS60, which signals are then applied to various elements of the common control to permit various functions to take place during each designated state.

The buffer store 250 is provided for use with the hold register as a hold-over memory portion for hold register searches. The binary status signals OH01 through OH32 are applied to the operator complex, while the signals HO1 through H32 are applied to the matrix control. The signal 038 to 040, which are direct codes of status, are applied to the control circuits 110.

A time zero signal TIM0 is derived from the encoder 210 to indicate to the timer each time a state changes in connection with a given junctor so that the timing functions performed by the timer may be reset to zero.

JUNCTOR MEMORY

Figure 3:
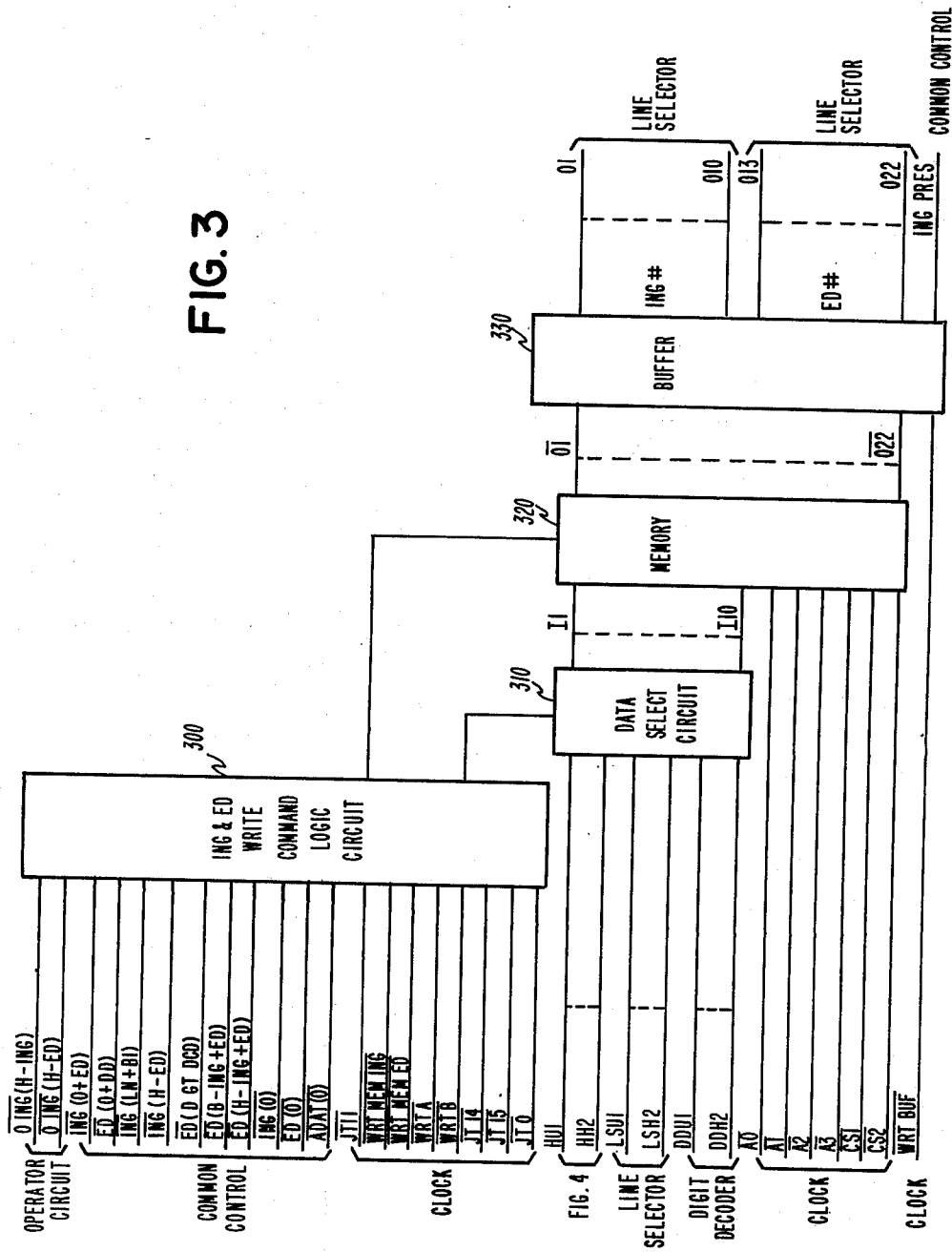
FIG. 3 is a schematic block diagram of the junctor memory incorporated in the present invention.

The junctor memory 140 includes an ING and ED write command logic circuit 300, shown in FIG. 3 which receives various command signals from the control circuit 110 along with junctor time slot signals from the clock and in turn controls the storage and read out of data into and out of a memory 320. The logic circuit 300 receives various command signals for storage of calling and called line numbers in designated locations of each junctor memory portion, which logic signals serve to control a data select circuit 310 receiving line numbers from the hold register on binary inputs HU1 through HH2, from the line selector on binary inputs LSU1 through LSH2, and from the digit decoder on binary inputs DDU1 through DDH2. In accordance with the commands applied to the logic circuit 300, the line numbers from the hold register, line selector, and digit decoder are gated to the memory 320 on leads 11 through 110 and stored in the memory 320 upon generation of the write command signal WRT from the logic circuit 300.

The commands received from the operator and the control circuits 110 relate to the storing of the calling and called numbers in the proper locations of each junctor portion of the memory. The command $\overline{\text{Oing}}$ (H-ing) indicates that the calling number from the hold register is to be stored in the ING number location of the junctor portion of the memory. Similarly, the command $\overline{\text{Oing}}$ (H-cd) indicates that the called number from the hold register is to be stored in the ING location associated with the attendant junctor. The command $\overline{\text{ing}}$ (O+ed) indicates placing the ed number from the operator in the ING register. The command $\overline{\text{ed}}$ (O+ed) indicates a request to place the ed number from the operator in the called portion of the memory. The command $\overline{\text{ing}}$ (LN+D1) indicates that the line number from the buffer is to be placed in the calling portion of the memory. The command $\overline{\text{ing}}$ (H-ed) indicates that the called number from the hold register is to be placed in the calling portion of the memory. The command $\overline{\text{ed}}$ (DDT DCD) indicates that the number from the digit decoder is to be placed in the called portion of the memory. The command $\overline{\text{ed}}$ (B-ing + ed) indicates that the calling and called line numbers from the buffer are to be inserted in the called portion of the memory. The command ed (H-ing + ed) indicates a request that the calling and called numbers from the hold register are to be placed in the called portion of the memory. The command ing (0) indicates that the number in the calling portion of the memory is to be zeroed. The command cd (0) indicates that the number in the called portion of the memory is to be zeroed. The command $\overline{\text{ADAT (0)}}$ indicates that all data is to be zeroed.

The signals from the clock represent the various junctor time slots during which the various commands are to be executed. The clock also provides the binary signals A0 through A3, CS1 and CS2 which represent the memory addresses of the junctor portion corresponding to the junctor times JCT0 through JCT32. These junctor signals control the circulation of the data within the memory 320 so that in combination with the junctor time slots applied from the clock to the logic circuit 300, the data will be inserted into the proper junctor portion of the memory during the proper time.

The output of the memory 320 is provided on leads $\overline{01}$ through $\overline{022}$ to a buffer store 330, which provides binary outputs 01 through 010 representing the calling number and binary outputs 013 through 022 representing the called number to the line selector. A further output ING PRES to the control circuits 110 indicates that the calling number is present and the output 0 RING PRES to the slot signals JT0 through JT15 from the clock 115. The comparison request commands include the command $\overline{0\text{COMP}}$ (ing-ing and ed) indicating a request for comparison of the ING number from the attendant's junctor and all ING and ED numbers stored in the junctor memory. The command $\overline{\text{COMP}}$ (ed-ed) indicates a request for a comparison of an ING number with all ING and ED numbers of the junctors other than the attendant junctor. The command $\overline{\text{COMP}}$ (ed-ing and ed) indicates a request for comparison of a called number with all calling and called numbers stored in the junctor memory. The command $\overline{\text{COMP}}$ (ing-ed) indicates a request for comparison of a calling number to all called numbers. The command $\overline{\text{COMP}}$ (ing-ing) indicates a request for comparing a calling number to all calling numbers stored in the junctor memory. The command $\overline{\text{COMP}}$ (ed-ed) indicates a request to compare a called number with all called numbers stored in the junctor memory.

Figure 4:
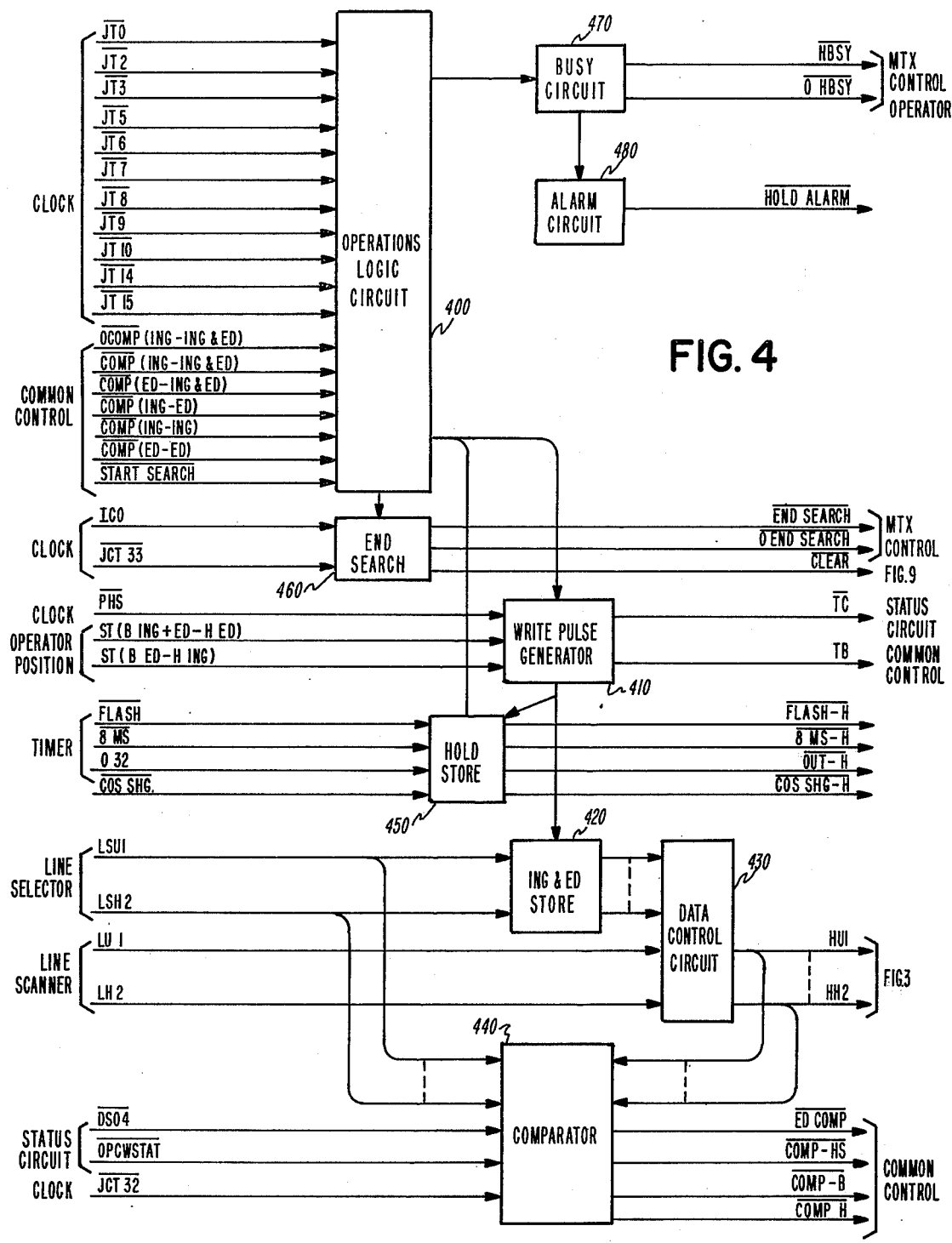
FIG. 4 is a schematic block diagram of the hold register incorporated with the present invention.

The various comparison requests are acted upon during various junctor time slots by the operations logic circuit and result in enabling of a write pulse generator 140, shown in FIG. 4 which in turn enables a hold store 450 and an ING and ED store 420. The hold store 450 receives various data relating to flashes, time-outs, whether the call is an incoming or outgoing call, a designation of the station hunting group, etc., for use by various elements of the common control during the course of the following operations.

The ING and ED store 420 in the hold register stores the calling and/or the called line number associated with a particular junctor as received from the line selector on binary inputs LSU1 through LSH2. For example, if the hold register is requesting a comparison of a called number with all of the calling and called numbers stored in the junctor memory during the time junctor 10 is being scanned, the called number stored in the junctor memory position assigned to junctor 10 will be transferred from the line selector on leads LSU1 through LSH2 to the ING and ED store 420. The numbers stored in the ING and ED store 420 is then applied through the data control circuit 430 to one side of a commmparator 440. During the subsequent scanning of the other junctors, the line selector will apply all calling and called line numbers stored in connection with these junctors on binary input lines LSU1 through LSH2 to the other side of the comparator 440. A comparison of the calling numbers stored in the store 420 with all of the calling and called numbers stored in the junctor memory is then effected by the comparator 440. This comparison forms part of the busy search, discussed in detail below, where the system attempts to determine whether a called line is busy by scanning all of the junctor positions in the junctor memory to determine whether that line circuit has its number stored in connection with any other junctor. In this case, the status decoder forming part of the status circuit 160 provides a signal $\overline{\text{DSO4}}$ to the comparator 440 enabling the comparison of the numbers stored in the ING and ED store 420 with all numbers received from the line selector.

Other comparisons which are performed within the hold register relate to the scanning of the lines by the line scanner 130. At the end of each junctor 32 time position the line scanner is advanced to the next line and will provide on binary input leads LU1 through LH2 in the hold register the line number which is to be scanned. This line number is applied to the data control circuit 430 which in turn applies it to one side of the comparator 440. During the subsequent scan of the information stored in the junctor memory in connection with the junctors, the comparator 440 will determine whether a comparison exists between the number designated by the line scanner and any number which may be stored in the junctor memory. For example, if a line goes off-hook it might be necessary for the system to determine whether an attempt is at that time being made to complete a call to that line circuit. Since the line scanner steps from one line to the next without knowledge of whether or not a line is already involved in a call, it is necessary for the system to determine before recognizing an off-hook condition from the line as a request for service to determine whether that off-hook condition is a result of a call already established by the system.

The comparator provides various outputs which may be required by the control circuits in the common control for various functions. The output ed-$\overline{\text{COMP}}$ indicates that only a comparison of the called number has been detected. The outputs $\overline{\text{COMP-HS}}$ and $\overline{\text{COMP-H}}$ indicates a general comparison detected. The output $\overline{\text{COMP-B}}$ indicates that a comparison of a line with its own number has been detected.

The data control circuit 430 merely serves to multiplex the data which is to be applied to the comparator so as to avoid interference between comparisons associated with data stored in the ING and ED store 420 and comparisons involving the number supplied from the line scanner. The data provided from the data control circuit 430 to the comparator 440 is also supplied to the junctor memory on binary output lines HU1 through HH2.

The write pulse generator 410 is also responsive to control signals from the operator and a signal PH5 from the clock to effect certain shifting of data as required by the system. For example, the signal ST ($b$ ing + ed-H ed) is a request to store the calling and called numbers from the buffer in the junctor memory in the called portion of the ING and ED store of the hold register. The signal ST (b ed-H ing) indicates a request to store the called number from the buffer in the junctor memory in the calling portion of the ING and ED store 420 of the hold register. Such transfers of information from one junctor to the other are necessary for various operations and require a holding of this information between junctor scan times so that the transfer from one junctor position to another junctor position in the junctor memory can be effected. This is accomplished in the ING and ED store 420 under control of the write pulse generator 410. The outputs TB and TC provide indications of the transfer operation.

The hold register also includes an end search circuit 460 connected to the operations logic circuit 400 and receiving the control signal ICO and the clock signal JCT33. The end search circuit 460 merely indicates when a complete scan of all the junctors has been completed. For example, if a search is conducted in the hold register in connection with information stored in junctor 10 position, it is necessary to compare this information with that stored in the junctor positions 11 through 31 and 0 through 9. When the scan once again reaches junctor 10, the end search circuit 460 indicates to the system that the search has been completed. The end search signal $\overline{\text{END SEARCH}}$ and $\overline{\text{0 END SEARCH}}$ are generated along with a $\overline{\text{CLEAR}}$ to effect control of various elements in the common control at the end of the search.

The hold register also includes a busy circuit 470 which is enabled whenever a comparison request or start search signal is applied to the operations logic circuit 400. The hold register performs one function at a time and is automatically made busy whenever a request for a comparison or search is received. When the hold register is busy, the signals $\overline{\text{HBSY}}$ and $\overline{\text{OHBSY}}$ are applied to the matrix control and operator complex, respectively. Since the hold register should not be busy for more than the time needed for one complete scan of all of the junctors, an alarm circuit 480 is provided in association with the busy circuit 470 which times the busy condition recorded by the busy circuit 470 for two complete scans of all of the junctors. If the busy circuit does not indicate the hold register to be free at the end of two complete scans of all of the junctors, an alarm signal $\overline{\text{HOLD ALARM}}$ is generated from the alarm circuit 480.

With respect to the remainder of the general system, reference may be had to our above-referred to copending application Ser. No. 431,928. Moreover, the details of the matrix control, line selector and line scanner are described in our copending application Ser. No. 431,878, filed Jan. 9, 1974, and assigned to the assignee of the present application.

For the discussion that follows, however, the previous description of the general system operation, coupled with the detailed description of the busy-test arrangement, is sufficient for one skilled in the art to both understand the operation of the present invention and to make and use the same.

BUSY TEST

Figure 7A:
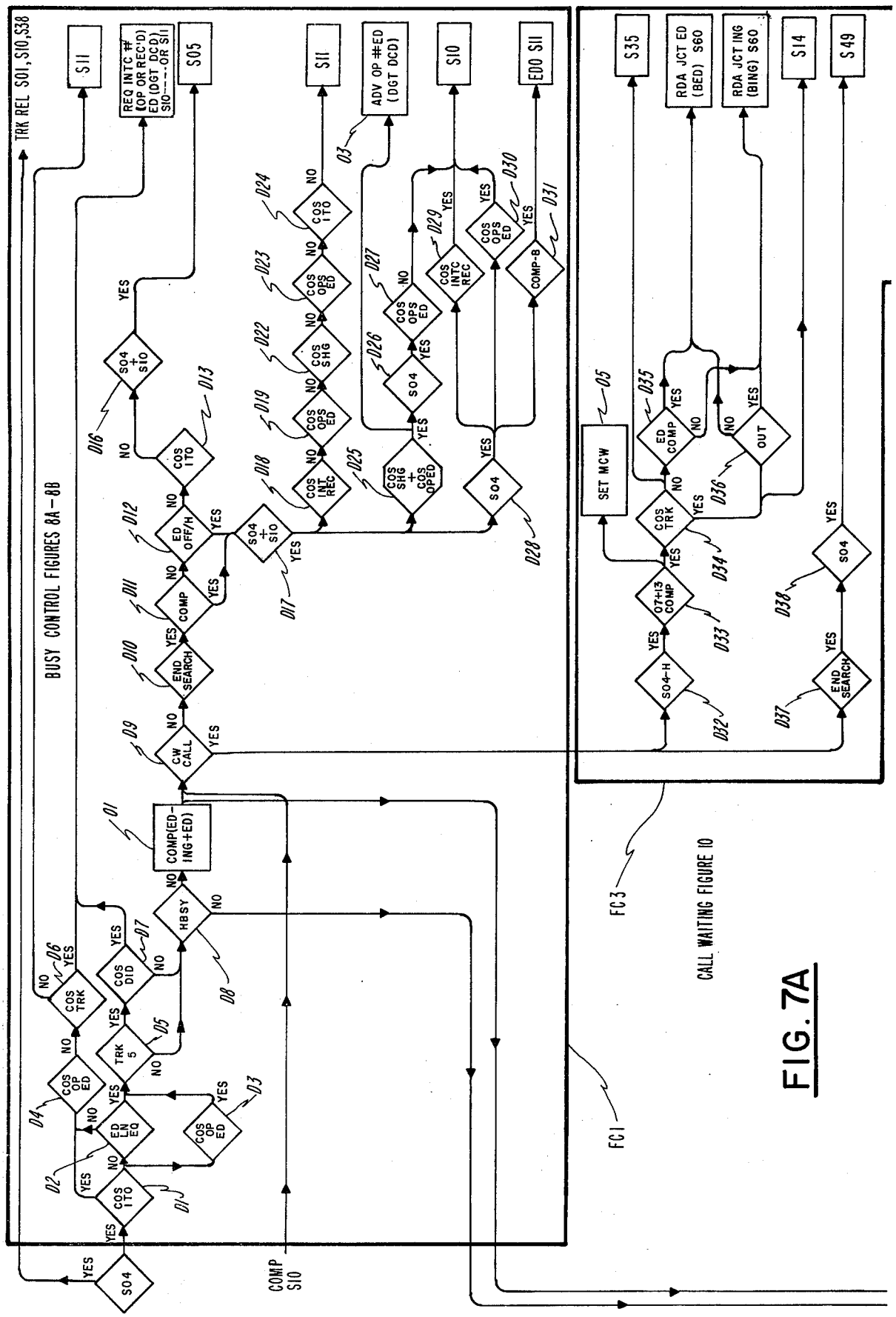
FIGS. 7a and 7b, in combination, form a detailed flow chart showing the operational decisions carried out during the busy test in accordance with the present invention.
Figure 7B:
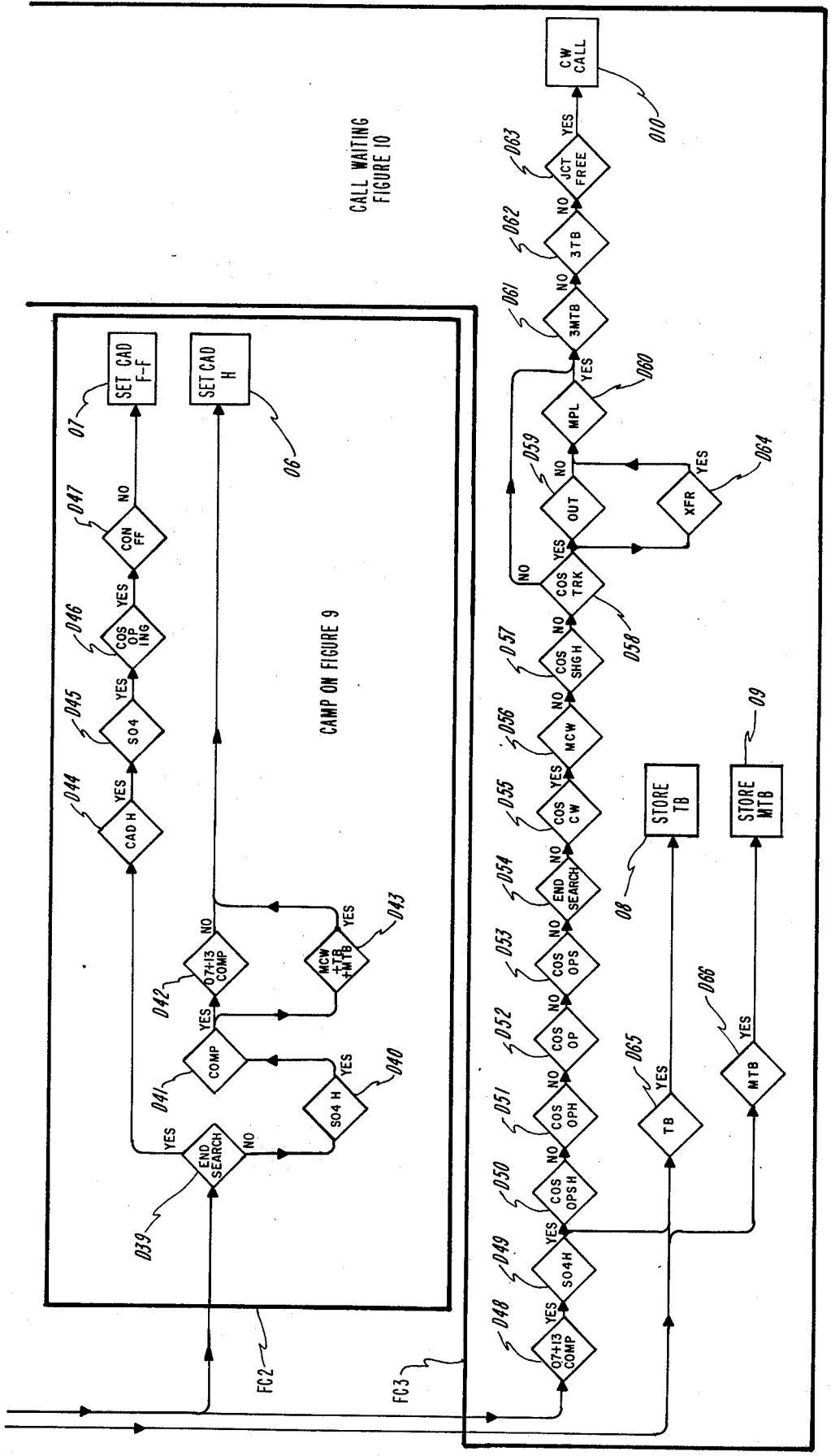

FIGS. 7a and 7b, in combination, depict a flow chart arrangement for the various logic decisions which are carried out with the use of the system components making up the common control 100 shown in FIG. 1b. The specific control circuitry shown in FIGS. 8a, 8b, 9, and 10 is contained within the control circuits 110, which are interrelated with the signals from the other components, including the class of service buffer 125, the hold register 135, the junctor memory 140, the status circuit 160, matrix control 165, etc., as described below, for carrying out busy-test.

For purposes of carrying out the busy-test, the logical decisions may be grouped into three categories. The first is busy control, shown within flow chart FC1 in FIG. 7a, the specific logic circuitry for implementing the same being shown in FIGS. 8a and 8b. This busy control flow chart FC1 illustrates a plurality of logic decisions $D_1$-$D_{31}$ which are selectively carried out depending upon the answers to previous decisions within a sequence to be described, so that the system can make a rapid evaluation of whether or not it is possible to advance from the busy-test status (status 4) to status 5, shown in FIG. 6, or to shift to some other status, such as busy tone (status 11) or call waiting (status 10). The call waiting feature is shown within flow chart FC3, while the camp-on feature is shown in flow chart FC2.

It should be remembered that the overall flow chart in FIGS. 7a and 7b represents functional operations carried out by the system for a particular junctor time slot during the junctor memory scan. Although, in accordance with the timing of the system, 816 microseconds are required to scan the entire junctor memory, for an individual junctor time slot (24 microseconds), each of the logic decisions illustrated in the flow chart of FIGS. 7a and 7b and effected by way of the exemplary schematic diagrams of FIGS. 8a–10 are carried out for making the busy test. During the other time slots (each of 24 microseconds duration) for the other junctor memory locations, the system will be carrying out the logical functions shown in FIGS. 7a and 7b for the other parties on their own time-shared basis. Normally, it requires only a single pass through the junctor memory to perform all that is necessary to proceed from one call status to another. Thus, under normal conditions, the status of the call will shift from status 4 to another status, such as status 5, or status 11, within the 816 microsecond junctor memory scan.

BUSY CONTROL

1-Local Call (Called Number Free)

As was discussed above in connection with the basic operation of the system and the progression from one call status to another, busy-test is initiated when the call status has shifted from status 3 to status 4. For purposes of the following discussion, the call to be set up is assumed to be a local call, to another line circuit which is free.

Being in status 4, the system makes an initial decision D1 (COS ITO) with respect to the class of service of the called number. The logic inquiry is whether or not the called number has "ing" capabilities only; namely, whether the called number cannot receive calls, but only make outgoing calls. For example, the station phone of a night watchman may be equipped with a number which permits the night watchman to make outgoing calls but prevents incoming calls from being directed to the number. This permits the night watchman to always have available to him the ability to call out in the event of an emergency and not be handicapped by incoming calls. In the initial logic sequence description, we are assuming that the called party is free and is a party who can accept calls. As a result, the result of decision D1 will be no and we proceed to decision D2.

In decision D2 (EDLNEQ), the system next inquires as to whether or not the called number is line equipped. The called number again, we are assuming, is a legitimate number, so that the answer must be yes. We then proceed to decision D5 (TRK 5) and ask whether the called number is a trunk number; of course, it is not, since the call is directed to another line circuit, so that the answer is no and we proceed to decision D8 (HBSY). The system now investigates as to whether or not the hold register is free so that a junctor search can be made. There is provided a memory location within the hold register which can receive the number, so that a comparison can be carried out, and, thus, the hold register can now make a pass over each junctor and compare its stored information with that for each respectively scanned junctor. This comparison operation is designated as block O1. Accordingly, the number which the calling party has dialed, the called number, is compared with every other calling and called number associated with a junctor, since the presently called number may be either a calling or a called party in another already established telephone connection.

It should also be observed that if the hold register is not busy, a separate parallel investigation regarding call-waiting in flow chart FC3 is effected. For the present, however, we are assuming we are not involved in a call having a call-waiting feature, the details of which will be discussed below. Thus, proceeding to decision D9 (CW CALL), the called number is not one involving call-waiting so that the answer to decision D9 is no.

Next, the system checks by way of decision D10 (END SEARCH) whether or not a complete memory search has been effected and, if so, we proceed to decision D11 (COMP) to inquire whether any of the calling or called numbers stored in memory has resulted in a positive comparison with the number in the hold register. Assuming that the called number is free, the answer is decision D11 is a no. In other words, for the entire 816 microsecond scan of the junctor memory, there does not appear any positive comparison between the number in the hold register and the junctors associated with other calling and called numbers.

As a final check, before proceeding, the system determines, in decision D12 (ED OFF H), whether or not the called party has gone off-hook, during the junctor memory scan. The system carries out this operation in the event that one of the junctors, which has been scanned and which was free, may have been assigned in the meantime to the called number prior to the completion of the complete junctor scan. For example, for a 32 junctor memory, and for a sequential scan, let it be assumed that junctor memory 3 has been assigned to the particular called number of interest subsequent to the scan of this junctor memory position. During the junctor memory scan, the scan of the junctor slot 3 would have indicated an absence of the called number for that junctor location, assuming that the called number was still on-hook. However, if, during the time of scanning from junctor 4 through junctor 32, the called party came off-hook, upon ending the search, the initial indication would have been that no junctor was assigned to the called number. Yet, in reality, junctor 3 has since been assigned to a called or calling number. Accordingly, as a final check, the system makes a called number off-hook check by examining the CB relay of the called number. Assuming again, that the called number is still free, the answer to decision D12 will be no.

To this point, the system has made two investigations. First of all, as a result of the junctor memory scan and comparison, the system was informed that the called number was not busy and, secondly, as a final check, after the memory scan indicated a free called number, the system carried out the CB relay check, to determine if the called number had gone off-hook.

The system now makes another calling-only class of service check in decision D13 (COS ITO) as was done in decision D1, for which the answer is no, of course, and proceeds to decision D16 (S04 + S10). The status of the call will be one of the statuses 4 or (+) 10, here, status 4, so that the answer decision D16 is yes so that there is an advance to status 5 for ringing.

In connection with the above description of logic sequences D1-D2-D5-D7-D8-O1-D9-D13-D16 within flow chart FC1, each particular decision Dn represents both the result of a logic function and an input to a subsequent function. These logic functions are implemented by hardware schematically depicted in FIGS. 8A and 8B. For purposes of assisting the correlation of the logic circuitry functions with the flow chart decision of FIG. 7, parenthetical insertions for the various decisions Dn will be employed in the description, where appropriate.

More specifically, by way of an input $\overline{DS04}$ from the status circuit 160, an input is supplied by way of inverter G10 to AND gate G24 that the call is in status 4. From the class of service buffer 125, through inverters G3 and G9, gate G24 receives another input indicating that the called number is not limited to only outgoing calls, i.e., it can receive incoming calls (D1). Thus, gate G24 provides an output representative of the initial decision D1. NOR gate G20 also receives a signal from the class of service buffer over line $\overline{ENLNEQ}$, so that gate G20 will provide an output indicating that the number is an equipped number (D2). The outputs of gates G20 and G24 are connected to gate G30, the output of which is coupled to gate G36. Another of the inputs of gate G36 is connected to the class of service buffer 125 which provides an output by way of the input to gate G4 through NOR gate G32 indicating that the called number is not a trunk number (D5). From the hold register, a non-busy signal $\overline{HBSY}$ (D8) is coupled by way of gates G21 and G25 to the third input of gate G36. The output of gate G36 is then coupled to NOR gate G39 and driver gate G41 to the hold register, for the comparison of the called number stored therein with the calling and called numbers stored in the junctor memory. The hold register than commences operation O1, shown in FIG. 7. Since the hold register is now making a comparison of all of the junctor time slots, the 24 microsecond time slot associated with the particular junctor of interest is terminated and the system proceeds through the other junctors for the remainder of the 816 microsecond time frame. Of course, it is possible that the hold register is busy, so that the system will have to wait another 816 microseconds until the scan returns to the junctor of interest. However, by this time the hold register should be free. In fact, even if a number of repeated sweeps are necessary until the hold register becomes free, as far as the calling party is concerned, the time frame is so short that there is no sensation of waiting to the calling subscriber.

Now, again, assuming that the called number does not have a call waiting feature (D9), a signal will be provided through gate G18 to one of the inputs of gate G28. Upon completion of the search (D10), the hold register will provide a signal $\overline{\text{END SEARCH}}$ through inverter G13 to one input of AND gate G16. With no comparison between the called number and the ING and ED numbers in the junctor memory having been made during the scan (D11), the gate G16 will be enabled by way of gates G6 and G12 to provide an enabling input to one input of gate G26. The other input is clocked to enable one of the inputs to gate G33.

Since the status of the call is one of the statuses 4 and 10, (i.e., status 4) inputs from the status decoder will be supplied to NOR gate G15 to enable one side of AND gate G18. Since the call does not have call-waiting features, by virtue of input signal $\overline{\text{CWCALL}}$, AND gate G18 is enabled, thereby enabling the other input of gate G33 for supplying a signal at the output thereof. This signal is coupled to one of the inputs of gate G47, in FIG. 8B, the other input of which receives an indication over lead COSITO that the called number can handle incoming calls (D13), thereby enabling gate G47 to supply an input to gate G47A. The other input of gate G47A comes from the class of service buffer which indicates the result of the test of the CB relay of the called number (D12), and with the called number still being on-hook, gate G47A is energized to supply a signal to the status circuit, so as to initiate ringing in status 5.

Figure 8B:
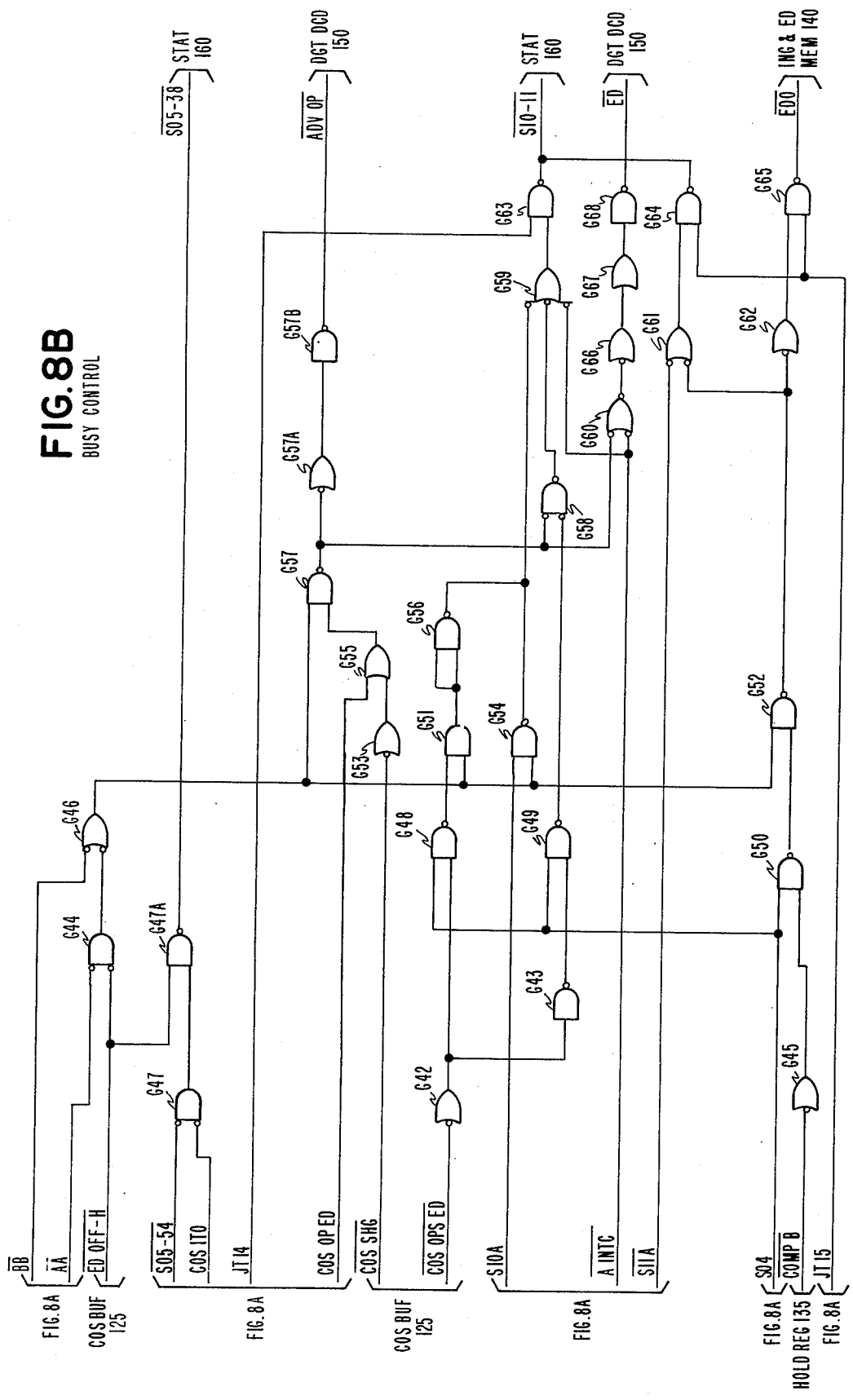

Thus, the logic circuitry shown in FIGS. 8A and 8B incorporated in the control circuits 110 and associated with the other components of the common control 100 determines, by way of one of the busy-test operations, that the called local number is free and that the status of the call can proceed to ringing status 5.

2-Local Call (Called Number Busy)

Referring again to FIG. 7, let it now be assumed that the called party is busy and a positive comparison was made during decision D11. The next decision D17 (S04 + S10) made by the system inquires whether the status of the call is status 4 or status 10. The call still remaining in status 4, the answer to the decision D17 is a yes. Next looking to decision D18 (COS INT REC), an inquiry is made whether the called number has a class of service whereby it is associated with an intercept recorder. Since the assumption has been made that it is still a simple line circuit, without special equipment, the answer to the decision D18 is no and the system proceeds to the next decision D19 (COS OPS ED) where the inquiry is made as to whether or not the called number has a class of service, whereby the called number is assigned as an operator. The answer is again no, so that proceeding to decision D22 (COS SHG) the system is informed that the called number is not in a station hunting group. The next sequential decision 23 (COS OP ED) indicates that the called number is not a PBX attendant. As the system has determined previously, the called line circuit is not excluded from handling incoming calls so that decision 24 (COS ITO) provides a no answer, whereby the status of the call advances to status 11—busy tone.

The circuitry within the control circuits 110 for effecting the above series of logic operations, depicted in FIGS. 8A and 8B, is as follows. As the result of a positive comparison from the register on signal line $\overline{\text{COMP-H}}$ (D11), gate G6 will supply an enabling input to gate G28. Also, in response to an end of search signal, (D10) gate G13 will supply another enabling input to gate G28. The third enabling input comes from gate G18; as discussed above, the called number does not have call-waiting features (D9) and the status of the call is in one of the statuses 4 or 10, here status 4 (D17. As a result, the output from gate G28 is connected to one of the inputs of gate G46, shown in FIG. 8B. NOR gate G46 will enable one of the inputs to gates G51, G54, G55 and G57. A signal indicating that the called number does not have a class of service involving an intercept recorder (D18) is supplied from the digit decoder 150 to gate G11 and a signal representative of the present status of the call (status 4) is supplied to the other input, so that the output of gate G11 is coupled to the other input of gate G54 over line $\overline{\text{COS INTC REC}}$, the output of which gate G54 is coupled to NOR gate G59. The class of service buffer 125 also provides an output indicating that the called number is not a station assigned to be an operator (D19) so that by way of inverter gate G42 and driver gate G43 an enabling input will be supplied to gate G49. The other input thereto is supplied from inverter gate G10 indicating that the call is in status 4 to thereby enable gate G49 and supply a signal to gate G58.

The class of service buffer 125 also provides signals indicating that the called number is not the PBX attendant (D23) and is not within a station hunting group (D22) thereby supplying enabling signals to gate G57 by way of gates G53 and G55, together with the output G46, mentioned above. Gate G57 then supplies a further signal to gate G58 the output of which is a second input of gate G59. A third input of gate G59 is delivered from gate G35 in response to the other processed signals discussed previously and the same for D23 and D24, so that the clock signal at junctor time slot 14 will enable gate G63 to supply a signal to the status register 160 for a shift to busy-tone status (i.e., status 11). Again, as was the case where the called party was a simple line circuit and free, the logic circuitry within the control circuits 110, coupled with the other circuitry within the common control, acts upon the conditions of the various factors defining the call and, with the called party being busy, enables the supplying of busy tone to the line circuit of the calling subscriber.

Before proceeding with the call-waiting and camp-on features of the busy-test flow chart diagrams FC2 and FC3, shown in FIG. 7, the manner in which busy test handles the call, before making any sort of number comparison in the hold register will be described. Namely, the effects of the other decisions D1-D7 will be explained.

3-Local Call (Outgoing Calls Only)

Looking now again at decision D1, let it be assumed that the called number, rather than being a standard local line circuit, has a class of service whereby it cannot accept incoming calls, but is equipped to process outgoing calls only. The result of decision D1 (COS ITO) being a yes, the system makes the second inquiry at decision D4 (COS OP ED) as to whether or not the called number has been assigned as a PBX attendant. Obviously, an operator can accept calls, so that in view of the yes answer from decision D1, decision D4 must be a no. With respect to the next decision D6 (COS TRK) where the system is concerned with a call to a local number which can only make outgoing calls, the called number does not have a trunk class of service, so that the answer to decision D6 is a no which results in the status of the call shifting from status 4 to status 11 and busy-tone is applied to the calling subscriber.

For carrying out the above decisions, as shown in FIGS. 8A and 8B, from the class of service buffer 125 there is provided a signal indicating that the local called number can handle only outgoing calls (it cannot receive incoming calls), so that by way of gates G2-G8 (D4) and gates G3-G14-G17 (D1), gate G19 is enabled which, in turn, enables one of the inputs of gate G23. The output input of gate G23 is enabled by way of gate G10, indicating that the status of the call is status 4, so that the gate G23 is enabled. The class of service buffer 125 also provides an enable signal $\overline{COS\ TRK}$ to gate G7, since the local caled number is not a truck (D6), so that by way of gates G7 and G22, the other input of gate G29 is enabled, to provide an output over line S11A which is delivered to gate G61 shown in FIG. 8B. The output of NOR gate G61 is coupled to enable one input of gates G64, the other input of which is enabled by way of the time slot input, to thereby provide an output to the status register 160 to indicate a transition from status 4 to status 11, so that busy tone will be provided to the calling party.

4-Local Call (To Attendant)

Returning again to decision D1, the initial path considered was decision D2. Considering decision D3 (COS OP ED) which is also a decision to be made, if a called number has a class of service as an operator (PBX attendant), the system again addresses itself to decision D5 (TRK 5). Thus, by way of gates G2-G8, there will be provided an alternative input to gate G20, so that its output will be coupled by way of gate G30 to the above-discussed gate G36 in the same manner described previously in connection with decisions D1, D2, D5 for a local line circuit.

5-Called Number Not Line-Equipped

Similarly, if a called number is not line-equipped, the result of decision D2 (EDLN EQ) will be a no, so that the system will again effect the decision D4, with the appropriate logic gates being enabled, as described above in connection with decisions D4 and D6 for an outgoing-call-only class of service.

Before proceeding with other features illustrated in the busy flow chart FC1, e.g., trunk call features of busy-test, the camp-on type features of busy-test will be considered.

CAMP-ON

Camp-on is a feature whereby a calling party calls the operator and asks the operator to make the call for him. If the operator attempts to make the call and discovers that the called number is busy, the attendant asks the calling party if the calling party desires to wait. If the calling party desires to wait, the attendant puts the calling party on hold. This enables the calling line to monitor the called line for a prescribed period of time (30 sec.). If the called line does not go back on hook within the 30 second period, the operator is again signaled and another inquiry is made with the calling party. For this operation, the called party will receive a special tone indicating that there is a calling party desiring a connection.

The other camp-on type feature, i.e., call-waiting, shown within flow chart FC3, takes place exclusive of the attendant. In accordance with this feature, when an incoming call reaches a busy called number, the called party is advised by a separate signal different from that normally provided from the attendant's turret when the attendant desires a camp-on feature, so that the called party will recognize that there is another calling party desiring a connection. In place of an operator function, the equipment automatically places the calling party on hold. As opposed to the camp-on feature requiring an attendant, wherein the calling party cannot be connected with the called party until the called party has finished its conversation and informed the attendant of the same, in call-waiting, the called party needs merely to flash the switch hook to place the originally calling party on hold and place the newly incoming calling party in the call. A further hook flash will reverse the situation, putting the originally calling party back in connection with the called party and place the newly calling party back on hold. This permits the calling party to go back and forth between the two calling parties.

With respect to the attendant camp-on feature, in the logic decision sequence which is shown in block diagram FC2 in FIG. 7, the essential determination which must be made is whether the called party is in a talking status. If the calling party is in some other status, such as transfer, ringing, etc., attendant camp-on is not possible. The sequence of logic decisions of flow chart FC2 illustrate the decisions to be made in reaching this determination.

Initially, following the hold register comparison operation O1, a decision D39 (END SEARCH) must be made as to whether or not the hold register has completed its comparison scan. Assuming that the hold register has not completed its search, a decision D40 (S04 H) is made as to whether or not the hold register search was initiated by status 4. Since it was, and upon making a comparison that the called number does have a junctor assigned to it, the result of the next decision D41 (COMP) is a yes. Next, two decisions are made, the first decision D42 (07 + 13 COMP) is whether or not the called number is in a talking status (status 7) corresponding to a local call talking, while status 13 corresponds to a trunk call talking. As was indicated above, it is only within these statuses, namely a talking situation, that a camp-on is allowed. If the called party is not involved in talking, namely, the result of decision D42 is a no, the system inquiry proceeds to operation 06 which is a camp-on-denied operation which sets a camp-on-denied hold within the hold register.

On the other hand, with respect to decision D43 (MCW + TB + MTB), if the memory has indicated that the call is involved in a call-waiting call (MCW), or if the transfer bit is set, i.e., the station being called is involved in a transfer (TB), or is involved in a local transfer (MTB), camp-on is also denied, so that as a result of a yes for decision D43, the system again denies camp-on.

With a camp-on-denied indication being stored in the hold register, when the hold register search is completed, decision D39 will be a yes as will, of course, decision D44 (CAD H) since, as was explained above, a camp-on-denied has been stored in the hold register. Since the call is still in status 4, decision D45 (S04) will be a yes. Decision D46 (COS OP ING) next inquires as to whether the calling party is an operator and assuming that this is true, decision D47 (CON FF) then inquires whether the call originated from a conference; since it has originated from an operator, the answer to decision D47 is a no, so that operation 07 will result in a setting of the camp-on denied flip-flop. This signals a lamp on the attendant's turret indicating that camp-on cannot be established.

Of course, during the same 24 second junctor time slot, while the camp-on-denied operation is being carried out, the above-discussed sequences of decisions are being carried out by the system simultaneously; so that busy-tone will be supplied to the calling party. The camp-on feature is a parallel sequence of decisions which, at the same time that a determination of busy and supply of busy tone is carried out with respect to the calling party, the attendant is advised that camp-on is not possible.

The logic circuitry for carrying out the above-discussed camp-on denied feature is shown in FIG. 9. Initially, the hold register will provide a signal to gate G71 indicating that the hold register scan has not yet been completed (D39). The signal will be coupled by way of driver gate G76 and NOR gate G82 to one input of a NAND gate G86. The other input of NAND gate G86 is coupled to gate G77. A signal representative of the talking status of the called number, either for a local call talking or a trunk call taking, is supplied from the attendant's logic by way of gates G67 and G72 (D42). A positive comparison in the hold register search (D41) is also supplied by way of gate G70 to enable gates G72 and G73, thereby coupling signals by way of gates G77, G84, G83, and G87 through gate G88 to one of the inputs of gate G79. Another of the inputs of gate G79 is enabled by gate G74 which receives the status 4 hold register indication signal (D40) and the positive comparison (D41). At junctor time slot 14, gate G79 is enabled, to provide a camp-on-denied indication by setting flip-flop FF1 (06). Signals from the attendant's control circuits are also provided at the input of gate G69 which, by way of gate G80, will also provide a camp-on-denied signal to set flip-flop FF1 (D43).

Once the hold register search has been completed (D39), gate G81 will be enabled by way of gates G66, G71, G75, and the $\overline{\text{CONFF}}$ line, to thereby set the camp-on-denied flip-flop FF2 through gate G89 (D44-D47, 07).

CALL-WAITING

Figure 10:
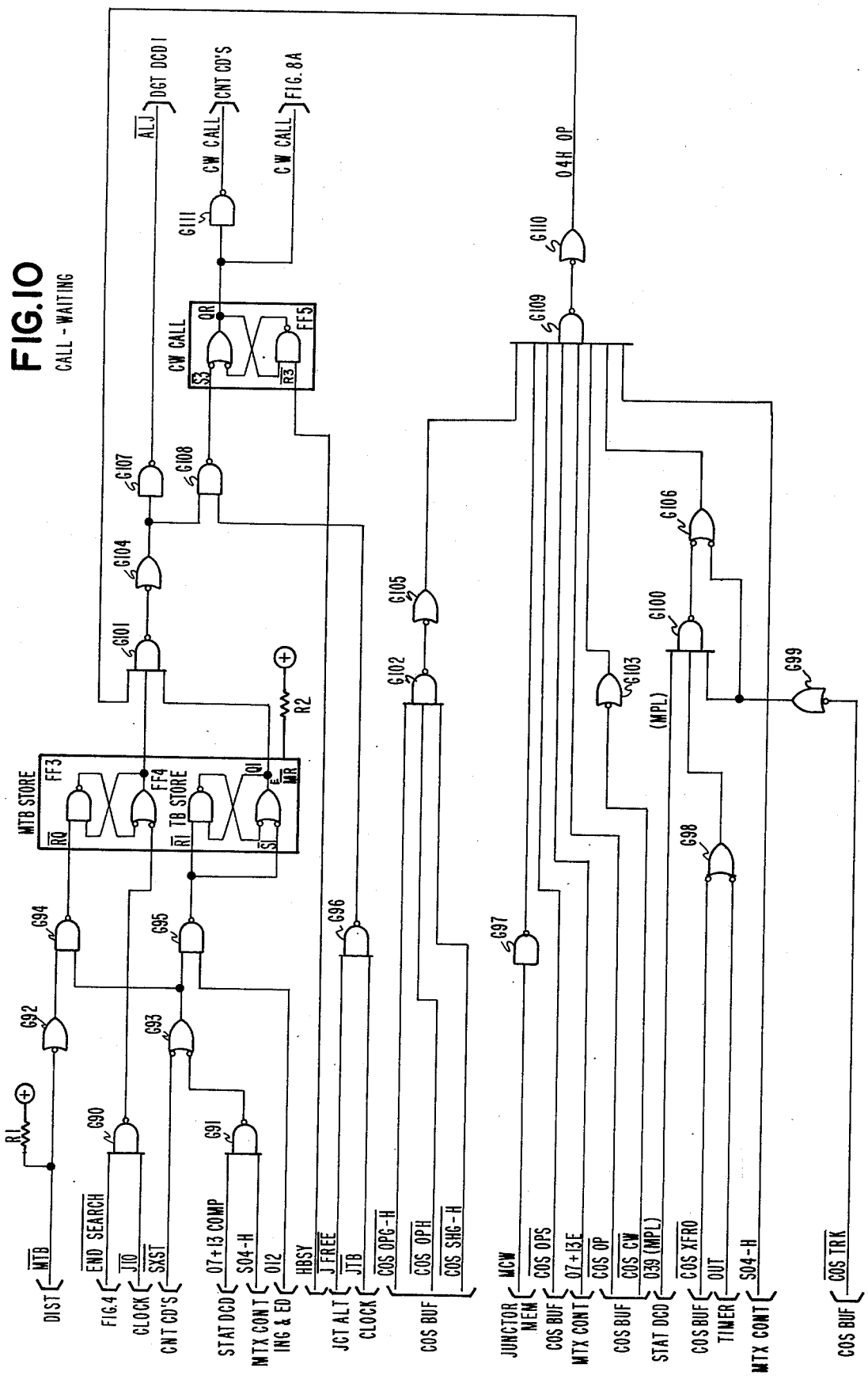

The third feature of the busy-test in accordance with the present invention is the call-waiting feature, the sequence of logic determinations for which is shown in flow chart FC3, in FIG. 7, and the schematic illustration of the circuitry for effecting the same is shown in FIG. 10. As was mentioned previously, call-waiting is a feature whereby the called party is informed that a calling party desires a connection independent of the operation of the attendant. For this purpose, the called line will be marked as to whether or not it has call-waiting capabilities.

Initially, in effecting this feature, from the hold register busy decision D8, the initial inquiry is made as to whether the call is involved in a transfer, either a trunk or a local transfer. If so, decisions D65 (TB) and D66 (MTB) cause respective bits indicative of the transfer to be stored in memory by way of operations 08 (STORE TB) and 09 (STORE MTB). As was mentioned above, if the called number is involved in a transfer, no form of camp-on, either attendant camp-on or call-waiting type camp-on is permitted.

Now, considering the hold register comparison scan (01), as the hold register proceeds from junctor to junctor, a comparison is made as to whether or not a trunk call status (status 13) or local call status (status 7) is involved, since call waiting is a camp-on feature, which is permitted only during a talking status. The result decision D48 (07 + 13 COMP) is a yes and the system inquires as to whether the hold register search was initiated in status 4, which it was, as was the case with the decision made for decision D40 in camp-on flow chart FC2, so that the result of decision D49 (S04 H) is a yes. The system next inquires as to whether the called number is involved in a transfer since, prior to the search, an inquiry must be made as to whether or not the calling number was involved in a transfer. In either situation (D65 or D66), call-waiting is not permitted. Again, if the called number is involved in a transfer, the appropriate bits are set in storage by way of operations 08 and 09.

Proceeding from decision D49, the system makes a series of decisions D50-D53 with respect to whether or not the operator is involved in either initiating the call D50 (COS OPS H) or receiving the call D51 (COS OP H) and if the called or calling number has a class of service whereby it is assigned as an operator D52 (COS OP) and D53 (COS OPS), respectively. In other words, if an operator is involved, call waiting is not permitted, so that the answer to each of decisions D50-D53 must be a no. The system then inquires whether or not the search has been completed at decision D54 (END SEARCH) and since the search is still continuing, the answer is a no.

The system next inquires as to whether or not the called number has a class of service identification that it will accept call-waiting calls. This is one of the requirements of the call-waiting feature, so that the answer to decision D55 (COS CW) will be a yes. The next decision as to whether or not the call-waiting bit for the particular called number has been set, i.e., whether or not the call-waiting has already been initiated for the called number, and we assume that it has not done so that the answer to decision D56 (MCW) is a no. The system further inquires as to whether the party attempting to reach the called party has a station hunting group class of service, which it does not, so that the answer to decision D57 (COS SHG H) will be a no.

With respect to decision D58 (COS TRK), assuming that we are dealing with a local call, the answer to decision D58 will be a no, so that the sequence proceeds to the transfer bit analysis in decisions D61 (3

MTB) and D62 (3 TB). If either of the calling or called stations is involved in a transfer, the TB or MTB bits will have been set in memory by way of operations 08 and 09, previously carried out; we have presumed that the bits were not set, otherwise call-waiting is not permitted.

Finally, the inquiry is made as to whether or not a local junctor is free and, if so, the resultant decision D63 (JCT FREE) will be a yes, so that the call is permitted the call-waiting feature by way of operation 010 (CW CALL).

For implementing the above sequence of logic operations in the circuitry shown in FIG. 10, initially, signals are supplied to gate G91 from the matrix control (D49) and status decoder (D48), which are coupled through OR gate G93 to one of the inputs of gate G95 and one of the inputs of gate G94. If transfer bit pulses are provided (D66 and D65), they are supplied to the transfer bit pulse storage flip-flops FF3 and FF4 to set the same (09 and 08). In call-waiting, however, we have assumed that neither the called nor the calling party is involved in a call transfer so that the flip-flops FF3 and FF4 will remain reset.

The signals relative to the other decisions D50-D57 are supplied from the class of service buffer, the matrix control, the junctor memory and the status decoder, through the gates G97-G106 to gate G109 as one of the inputs of gate G101. Since the storage flip-flops FF3 and FF4 are reset, as indicated above, gate G101 is enabled to supply an enabled junctor allotter signal through gates G104 and gate G107 to the digit decoder. If a junctor was free, gate G96 will be enabled to set the call-waiting flip-flop FF5, so that an indication will be provided therefrom that a call-waiting feature is permitted.

It should be remembered here that the sequence of logic operations shown for the call-waiting feature in flow chart FC2 correspond to individual decisions which constitute the decision D9 as to whether or not call-waiting is involved. Thus, in proceeding from the hold register search operation 01 to the decision D9, the logic decisions D48-D66 will have been made so that the system will know whether or not a call-waiting call is involved.

If the number has a trunk class of service feature, decision D58 (COS TRK) will be a yes and the system then inquires as to whether there is a memory out bit or a zero transfer and then decision D60 (MPL) inquires of a memory PL relay bit. These decisions are effected by way of signals from the timer and class of service buffer through gates G98 and G103 as other inputs to the gate G109, with the above-discussed operation taking place as described.

Now, assuming that the call is involved in call-waiting, the sequence of decisions D48-D63 would have provided a yes decision for decision D9. Proceeding from a yes answer to decision D9, still within the call register search in status 4, the answers to decisions D32 (S04 H) and D33 (07 + 13 COMP) will again be yes, as they were for decisions D48 and D49. The system now proceeds to operation 05 to set the call-waiting bit for the called party indicating involvement in call-waiting. The junctor is now marked so that if another party attempts to obtain a connection, he will be advised that camp-on is not permitted since the MCW bit is set.

Next, an inquiry is made as to whether or not the call involved is a trunk. For a local call, decision D34 (COS TRK) will provide a no answer, so that the system proceeds to provide a tone to the junctor. The system further inquires in decision D35 (ED COMP) whether the comparison during the call register scan was with a called or calling number. For a called number the junctor is random addressed. This permits the use of a temporarily employed additional junctor for the application of the call-waiting identification tone. Similarly, if a positive comparison was made with a calling number, the junctor would again be random addressed. If the number called is not a line number, but is a trunk number, the answer to the decision D34 would be a yes (the number has a trunk class of service feature) and decision D36 (OUT) is then initiated. Namely, the system inquires as to whether the call involved is an outgoing or incoming call. In either case, the junctors will be temporarily random addressed as was the case with the hold register comparison in decision D35. Moreover, if a trunk is involved, the trunk will be placed on hold in status 14.

As is shown in FIG. 10, these decisions are implemented in a straight forward manner by logic gates G99, G100, G106, G109, etc. Once the hold register search has been completed, decisions D37 (END SEARCH) and, accordingly, D38 (S04) will provide yes answers to provide call-waiting ring back (status 49). Gate G90 couples the end of search signal from the hold register to the flip-flop FF3 and to gate G101.

Now, the various additional features of the busy control sequence illustrated in flow chart FC1 in FIG. 7 will be explained.

BUSY CONTROL

6-Trunk Call

For a trunk call only a direct-inward-dialing (DID) call can proceed to a busy test; otherwise, the attendant extends the call. Thus, for a DID trunk, the system makes the same initial inquiries beginning in status 4 and proceeding through decision D1-D4. At decision D5 (TRK 5) since a trunk a call is involved, the answer is a yes and the sequence proceeds to decision D7 (COS DID). In decision D7 the system determines whether the called station is allowed to accept DID calls. If it is not permitted to accept calls, the answer to decision D7 is a yes and the system is given a choice. On the one hand the trunk receives busy-tone (status 11), or the call is diverted to the attendant or to an intercept recorder (status 10). In this condition the called number is replaced by the attendant number of by the number of the intercept recorder.

For implementing this operation with the logic shown in FIGS. 8A and 8B, trunk and direct-inward-dialing signals from the class of service buffer 125 will be coupled by way of gates G4 (D5) and G31 (D7) to gate G35, then to gate G59 and gate G63 to the status register, to effect intercept by way of the operator or recorder, or the application of busy-tone in status 11.

If the line is allowed to accept DID calls, the answer to decision D7 will be no, and the system proceeds to the hold register search, etc., as it did with a local call.

Similarly, where the called number has a trunk class of service feature (D6) the call is diverted to the attendant or to an intercept recorder. This is effected by an output from gate G34 which receives a signal via gate G7 from the class of service buffer.

7-Attendant Request

If the calling party is attempting to reach the attendant then, subsequent to the hold register search, the logic sequence will proceed to decision D17 (S04 +S10). Again, answering a status 4 busy test, the decision D25 (COS SHG +COS OPED) is effected. If the operator number has been dialed, and is busy, the operator number is advanced in operation 03 to the next number in the operator loop. (Typically, there may be four operator numbers in the loop.) For each number advanced, the busy test is repeated to see if that loop number is free. At the same time status decision D26 (S04) is carried out. Since the system is in the busy test status, the answer to decision D26 is a yes, and the inquiry proceeds to decision D27 (COS OPS ED). Here, it is determined whether the line is equipped with an operator class of service. Since the operator number was dialed, the answer is no and the status register effects a shift to status 10 to search for the attendant (attendant busy test). Here, the new loop number of the operator becomes the called number and a status 4 busy test is carried out for this new operator loop number. The attendant's loop number is advanced every 320 microseconds until a free attendant's loop number is obtained. A true busy condition does not exist since the attendant will eventually be connected with the calling party by way of one of the loop numbers, even if recycling is necessary.

For implementing, the attendant call logic functions, a $\overline{\text{COS OP ED}}$ signal is supplied from the class of service buffer 125 to gate G2 which is connected to one input of G55 (D25). The other input of gate G55 is connected to the output of gate G53 which receives a $\overline{\text{COS SHG}}$ signal from the class of service buffer 125. The output of gate G57 is coupled to the digit decoder 150 through driver gates G57A and G57B to advance the operator loop number (03). At the same time gate G42 receives a $\overline{\text{COS OPS ED}}$ signal from the class of service buffer and enables one input of AND gate G49 (D27) through gate G43. The other input is coupled to the output of inverter G10, which couples a status 4 signal from the digit decoder to gate G48, to enable the gate (D26). The output of gate G49 is coupled by way of gates G58, G59, and G63 to the status register 160 to provide the status 10 transfer for effecting the attendant's busy test.

8-Intercept Recorder

If the calling party is to be diverted to an intercept recorder, then after a status 4 inquiry in decision D28 (S04), the sequence proceeds to decision 29 (COSINTIC REC) which is affirmative. Again, the status goes from 4 to 10. Like the attendant's loop number advance, the system periodically checks to see whether the intercept recorder has become free. The logic for implementing this function is carried out by gate G11 which receives a status 4 and an intercept recorder signal from the digit decoder.

9-Number Assigned as Attendant

Where a line is equipped with a class of service as an attendant (e.g., a night station) then decision D30 (COS OPS ED) is effected. As was the case with the attendant's loop number advance and the intercept recorder wait, busy-tone is not supplied to the calling party. Instead, a periodic check on the condition of the night station number is made until it becomes free. The logic for implementing this function includes gate G42 and gate G48 which is enabled in a manner similar to gate G49 discussed above, except for the yes answer to the decision D30 as opposed to the no answer for decision D27. Thus, the inverter G43 is excluded.

10-Calling Number Dialed

In the event that the calling party dials his own number, decision D31 (COMP B) is performed. If the calling number has been dialed, the number is removed from memory and busy-tone is supplied in status 11. For implementing this operation, gate G45 receives a signal from the hold register indicating that the calling number has been dialed. The output of gate G45 together with a status 4 signal enable AND gate G50, the output of which is coupled through gates G52, G61, and G64 to thee status register for supplying busy-tone in status 11.

From the foregoing detailed description of the present invention, it will be appreciated that irrespective of the type of call attempted to be established, by virtue of the interconnections of the common control circuitry, a busy-test operation can be performed, exclusive of matrix by way of which the conversation between parties is conveyed. Moreover, memory storage is not unnecessarily tied up during the test carried out for each call on a time-shared basis so as to expedite both the delivery of a busy indication to the calling party and transfer to ringing status.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. In an electronic private automatic branch exchange including a switching matrix for effecting connections between calling and called circuits, each calling and called circuit being associated with a junctor, and a common control for controlling the sequence of operations for the establishment of a call between a calling and a called circuit, the improvement wherein said commmon control includes
    a memory, having a prescribed number of storage locations, for storing the number of each respective calling and called circuit associated with a call, and
    means, responsive to a request for a connection from a calling circuit to a prescribed called circuit, for scanning said memory and determining whether or not the number of said prescribed called circuit is stored in said memory,
    whereby an indication of the busy status of said prescribed called circuit can be determined from the contents of said memory.

2. The improvement according to claim 1, wherein said common control further includes means for checking the status of the calling bridge relay of said prescribed called circuit subsequent to the completion of the scan of said memory by said scanning means, to thereby determine whether or not said prescribed called circuit has gone off-hook subsequent to the scan of said memory.

3. The improvement according to claim 1, wherein said memory comprises a junctor memory for storing the number of each respective called and calling circuit to which a junctor has been assigned for the establishment of a call, and wherein said scanning means includes a hold register for temporarily storing the number of said prescribed called circuit and for comparing the number stored therein with the numbers stored in each junctor memory location in said junctor memory during the scan thereof.

4. The improvement according to claim 3, wherein said common control further includes means for checking the status of the calling bridge relay of said prescribed called circuit subsequent to the completion of the scan of said junctor memory and number comparison by said hold register, to thereby determine whether or not said prescribed called circuit has gone off-hook subsequent to the scan of the junctor memory.

5. The improvement according to claim 1, further including means, responsive to a determination of the busy condition of said prescribed called circuit by said scanning means for causing a busy signal to be delivered to said prescribed calling circuit.

6. The improvement according to claim 1, further including means, responsive to a determination of the busy condition of said called circuit by said scanning means and to a prescribed class of service assigned to said prescribed called circuit for preventing the delivery of a busy signal to said prescribed calling circuit.

7. The improvement according to claim 6, wherein said preventing means includes means for placing said calling circuit on hold while delivering an indication to said prescribed called circuit that said calling circuit is attempting to obtain a communication with said prescribed called circuit.

8. The improvement according to claim 6, wherein said preventing means includes means for advancing the number of said prescribed called circuit to another number associated with said prescribed called circuit and causing said scanning means to rescan said memory and compare said another number with the numbers stored in its respective storage locations.

9. The improvement according to claim 6, wherein said memory comprises a junctor memory for storing the number of each respective called and calling circuit to which a junctor has been assigned for the establishment of a call, and wherein said scanning means includes a hold register for temporarily storing the number of said prescribed called circuit and for comparing the number stored therein with the numbers stored in each junctor memory location in said junctor memory during the scan thereof.

10. The improvement according to claim 9, wherein said common control further includes means for checking the status of the calling bridge relay of said prescribed called circuit subsequent to the completion of the scan of said junctor memory and number comparison by said hold register, to thereby determine whether or not said prescribed called circuit has gone off-hook subsequent to the scan of the junctor memory.

11. The improvement according to claim 7, wherein said memory comprises a junctor memory for storing the number of each respective called and calling circuit to which a junctor has been assigned for the establishment of a call, and wherein said scanning means includes a hold register for temporarily storing the number of said prescribed called circuit and for comparing the number stored therein with the numbers stored in each junctor memory location in said junctor memory during the scan thereof.

12. The improvement according to claim 11, wherein said common control further includes means for checking the status of the calling bridge relay of said prescribed called circuit subsequent to the completion of the scan of said junctor memory and number comparison by said hold register, to thereby determine whether or not said prescribed called circuit has gone off-hook subsequent to the scan of the junctor memory.

13. In an electronic private automatic branch exchange including a switching matrix for effecting connections between calling and called circuits, each calling and called circuit being associated with a junctor, and a common control for controlling the sequence of operations for the establishment of a call between a calling and a called circuit, the improvement wherein said common control includes
a junctor memory, having a plurality of storage locations, for storing the number of each respective calling and called circuit which has been assigned a junctor associated with a call, and
means, responsive to a request for a connection from a calling circuit to a designated called number, for scanning said memory and determining whether or not said designated called number is stored in said memory,
whereby an indication of the busy status of the circuit associated with said designated number can be determined from the contents of said memory.

14. The improvement according to claim 13, further including means for causing busy tone to be delivered to said called circuit in response to said designated number corresponding to a number for which a junctor may not be assigned.

15. The improvement according to claim 13, further including means for diverting said call to a call intercepting circuit and thereby by-passing said junctor memory and scanning means in response to said designated number being associated with a trunk other than a direct-inward-dialing trunk.

* * * * *